United States Patent
Weiss et al.

(10) Patent No.: US 7,457,312 B2
(45) Date of Patent: Nov. 25, 2008

(54) BANDWIDTH SHARING IN ADVANCED STREAMING FORMAT

(75) Inventors: Rebecca C. Weiss, Kirkland, WA (US); Brian Crites, Sammamish, WA (US); Geoff Dunbar, Kirkland, WA (US); Philippe Ferriere, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1031 days.

(21) Appl. No.: 10/175,230

(22) Filed: Jun. 19, 2002

(65) Prior Publication Data
US 2003/0236902 A1    Dec. 25, 2003

(51) Int. Cl.
*H04J 3/16* (2006.01)

(52) U.S. Cl. .............. 370/468; 370/473; 709/226; 709/231; 709/233

(58) Field of Classification Search ........... 370/493, 370/464, 468, 262, 473; 709/226, 230, 231, 709/233
See application file for complete search history.

(56) References Cited

U.S. PATENT DOCUMENTS

| | | | |
|---|---|---|---|
| 5,642,152 A * | 6/1997 | Douceur et al. | 725/97 |
| 5,852,630 A * | 12/1998 | Langberg et al. | 375/219 |
| 5,867,230 A | 2/1999 | Wang et al. | |
| 5,928,330 A * | 7/1999 | Goetz et al. | 709/231 |
| 5,953,506 A * | 9/1999 | Kalra et al. | 709/231 |
| 5,995,491 A * | 11/1999 | Richter et al. | 370/263 |
| 6,041,345 A | 3/2000 | Levi et al. | |
| 6,055,577 A * | 4/2000 | Lee et al. | 709/233 |
| 6,069,872 A * | 5/2000 | Bonomi et al. | 370/236 |
| 6,069,879 A * | 5/2000 | Chatter | 370/295 |
| 6,134,596 A | 10/2000 | Bolosky et al. | |
| 6,208,640 B1 * | 3/2001 | Spell et al. | 370/358 |
| 6,442,550 B1 * | 8/2002 | Rajamony | 707/10 |
| 6,456,591 B1 | 9/2002 | Mishra | |
| 6,460,086 B1 | 10/2002 | Swaminathan et al. | |
| 6,516,356 B1 * | 2/2003 | Belknap et al. | 719/328 |
| 6,754,905 B2 * | 6/2004 | Gordon et al. | 725/38 |
| 6,772,217 B1 | 8/2004 | Baumann et al. | |
| 6,792,449 B2 | 9/2004 | Colville et al. | |
| 6,856,997 B2 | 2/2005 | Lee et al. | |

(Continued)

OTHER PUBLICATIONS

Hagsand et al., WO 02/37724 A1, May 10, 2002, WIPO.*

(Continued)

*Primary Examiner*—Hassan Kizou
*Assistant Examiner*—Brian T. O'Connor
(74) *Attorney, Agent, or Firm*—Senniger Powers LLP

(57) ABSTRACT

Modulated data signal having data fields encoded in a data structure defining a bandwidth sharing object for transmission over communications channels. A first data field contains a first stream of first information having a first bandwidth. A second data field contains a second stream of second information having a second bandwidth. The first stream is transmitted simultaneously with the second stream. One or more additional data fields each contain an additional stream of information having an additional bandwidth. The additional streams are transmitted simultaneously with the first and second stream. A bandwidth number indicated in the object is a function of the bandwidth of the first stream, the second stream, and the one or more additional streams. A bandwidth value indicated in the object is less than the total of the first bandwidth, the second bandwidth, and the total bandwidths of the one or more additional streams.

30 Claims, 4 Drawing Sheets

U.S. PATENT DOCUMENTS

| | | | |
|---|---|---|---|
| 6,865,609 | B1 | 3/2005 | Gubbi et al. |
| 6,898,285 | B1 * | 5/2005 | Hutchings et al. ........... 380/200 |
| 6,904,463 | B1 | 6/2005 | Fadel |
| 6,934,752 | B1 * | 8/2005 | Gubbi ........................ 709/225 |
| 6,954,739 | B1 | 10/2005 | Bouillet et al. |
| 6,978,306 | B2 * | 12/2005 | Miller et al. ................. 709/226 |
| 7,047,309 | B2 | 5/2006 | Boumann et al. |
| 7,058,720 | B1 | 6/2006 | Majidimehr |
| 7,177,323 | B2 * | 2/2007 | Yavatkar et al. ............. 370/468 |
| 7,218,635 | B2 * | 5/2007 | Haddad ...................... 370/394 |
| 7,254,142 | B2 * | 8/2007 | Hagsand et al. ............ 370/468 |
| 2002/0007389 | A1 | 1/2002 | Jones et al. |
| 2002/0026645 | A1 * | 2/2002 | Son et al. ..................... 725/117 |
| 2002/0053075 | A1 | 5/2002 | Paz et al. |
| 2003/0043847 | A1 * | 3/2003 | Haddad ...................... 370/473 |
| 2003/0043919 | A1 * | 3/2003 | Haddad ................. 375/240.25 |
| 2006/0015574 | A1 | 1/2006 | Seed et al. |
| 2006/0088057 | A1 | 4/2006 | Gummalla et al. |
| 2006/0265512 | A1 | 11/2006 | Allen |

OTHER PUBLICATIONS

Li et al., "Active Gateway: A Facility for Video Conferencing Traffic Control", IEEE Computer Software and Applications Conference, Aug. 13-15, 1997, p. 308-311.*

Zhao et al, "Bandwidth-efficient Continuous Media Streaming Through Optimal Multiplexing," Proceedings of the International Conference on Measurement and Modeling of Computer Systems, 1999, pp. 13-22, ACM Press, New York, U.S.A.

Baldi et al., "Adaptive Group Multicast with Time-Driven Priority," IEEE/ACM Transactions on Networking, Feb. 2000, pp. 31-43, vol. 8, Issue 1, ACM Press, New York, U.S.A.

Bar-Noy et al., "Competitive On-Line Stream Merging Algorithms for Media-On-Demand," Proceedings of the Twelfth Annual ACM-SIAM Symposium on Discrete Algorithms, 2001, pp. 364-373, ACM Press, New York, U.S.A.

Brassil et al., "Program Insertion in Real-Time IP Multicasts," ACM SIGCOMM Computer Communication Review, Apr. 1999, pp. 49-68, vol. 29, Issue 2, ACM Press, New York, U.S.A.

Feng et al., "Adaptive Packet Marking for Maintaining End-to-End Throughput in a Differentiated-Services Internet," IEEE/ACM Transactions On Networking, Oct. 1999, pp. 685-697, vol. 7, Issue 5, ACM Press, New York, U.S.A.

Fred et al., "Statistical Bandwidth Sharing: A Study of Congestion at Flow Level," Proceedings of the 2001 Conference on Applications, Technologies, Architectures, and Protocols for Computer Communication, 2001, pp. 111-122, ACM Press, New York, U.S.A.

* cited by examiner

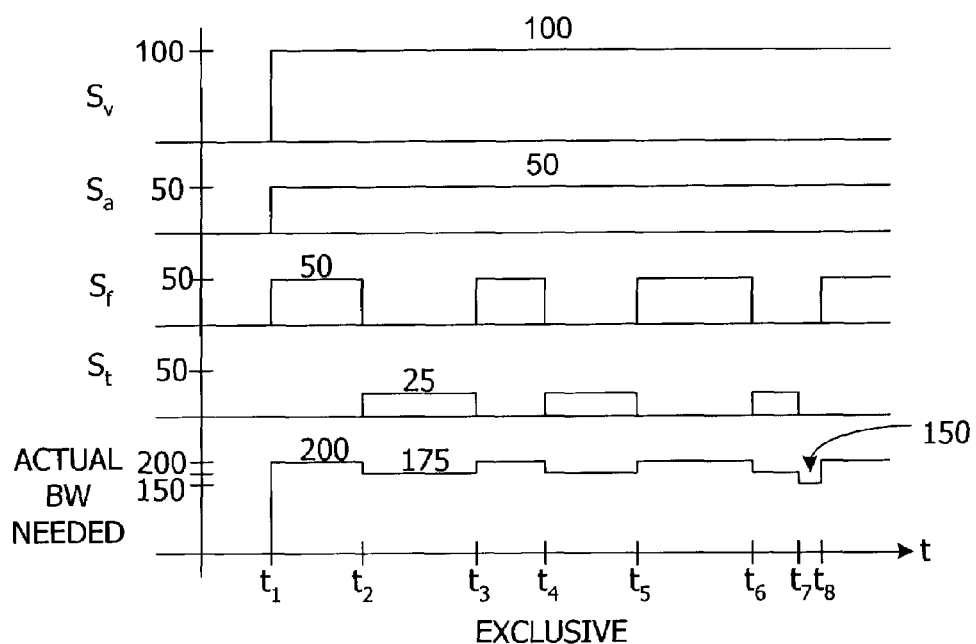
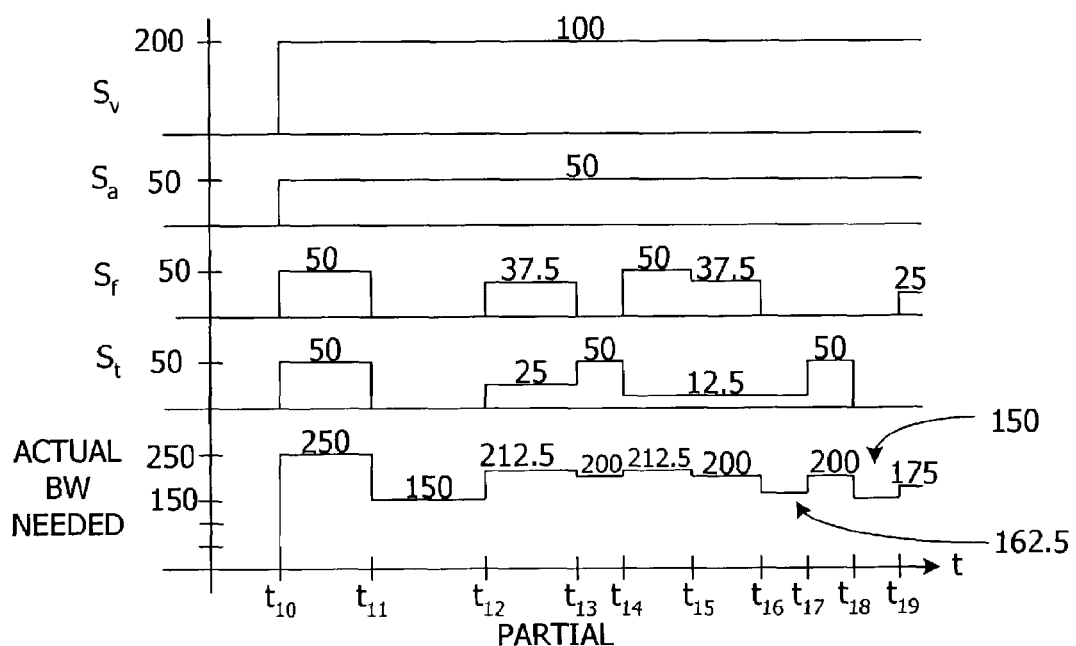

BANDWIDTH SHARING IN ADVANCED STREAMING FORMAT

TECHNICAL FIELD

The present invention relates to the field of multimedia streaming. In particular, this invention relates to a system and method for determining allocations of bandwidth to streamable content comprising multiple streams of varying bandwidth.

BACKGROUND OF THE INVENTION

An advanced streaming format (ASF) file (also referred to as an active stream format file or advanced system format) contains one or more multimedia streams, as disclosed in U.S. Pat. No. 6,041,345. A multimedia stream contains the data for one particular part of the overall ASF file. For instance, a typical ASF file might contain two multimedia streams, one containing the audio data for the file, and the other containing the video data for the file. Playback of an ASF file (either over a network or via the local hard drive) is done by playing the data from one or more of the multimedia streams. It is valid behavior (and desired practice in many cases) to only play a subset of the multimedia streams in the overall ASF file. Each stream has its own maximum bit rate and maximum buffer window which together describe the amount of network resources required in order to send that multimedia stream from a server over the network such that it can be played in real-time by a client. Since each multimedia stream's network resource requirements are independent of those for other streams, the bit rate and buffer numbers for each stream numbers in an ASF file are in general summed to determine the requirements for sending the ASF file including all its streams, simultaneously, a particular subset of the multimedia streams available in an ASF file.

One problem posed by this method of calculating network resource requirements is that it can be an overestimate because the total requirements needed are not always additive across streams. Bitrate and the fullness of the buffer window can vary with time for a particular stream. An example of this variation might be a non-audio, non-video stream whose bandwidth utilization is bursty. Overestimating the network resource requirements of a subset of multimedia streams in an ASF file is suboptimal; it will cause the server to select a suboptimal subset of multimedia streams, or even refuse to stream any multimedia streams at all even though in fact the resources may be sufficient.

Some streaming media formats cannot carry streams other than audio or video streams. Thus, it appears that these formats handle non-audio, non-video data in files separate from the main file and presumably stream such extra data separately. Streaming media formats with this limitation make it difficult or impossible to coordinate the total bandwidth consumption of multiple multimedia streams, causing suboptimal or incorrect behavior in limited network resource conditions. In addition, it sometimes enhances the presentation to have file transfer streams, text/caption streams, or script command streams which do at times exhibit the bursty behavior mentioned above. The ASF addresses this by having file transfer streams, text/caption streams, script command streams, and all other multimedia streams stored as part of the ASF file along with traditional audio and video multimedia streams.

For these reasons, a system and method for designating bandwidth sharing among streams is desired to address one or more of these and other disadvantages.

SUMMARY OF THE INVENTION

The invention includes software data structures, and file format specifications for bandwidth sharing. In particular, an embodiment of the invention allows the content author to specify any known relationships between two or more streams in an ASF streaming file format that limit their total declared resource usage to allow for greater accuracy in determining the bandwidth and buffer size to allocate when streaming the content.

The invention for sharing bandwidth enhances ASF and other streaming formats by eliminating one of the major drawbacks of such formats. Namely, by adding streams that each claim network resource requirements, the total network resource requirements declared for a subset of multimedia streams may rise to an unnecessarily high level that cannot be accommodated in more constrained network scenarios. Bandwidth sharing allows the content author to take full advantage of the extensibility of ASF by providing a way to specify the combined network resource requirements for all the streams various subsets of multimedia streams.

In accordance with one aspect of the invention, a modulated data signal has data fields encoded thereon which define a bandwidth of the modulated data signal. The signal is transmitted over a communications channel. The signal comprises at least three data fields. A first data field contains descriptive information of a first stream having a first bandwidth. A second data field contains descriptive information of a second stream having a second bandwidth. The first bandwidth is greater than or equal to the second bandwidth and at least at certain times the first stream is transmitted simultaneously with the second stream. A third data field includes an object having a bandwidth value indicating a designated bandwidth for simultaneously streaming the first and second streams In accordance with another aspect of the invention, a modulated data signal has data fields encoded thereon transmitted over a communications channel having an assigned bandwidth. The modulated data signal comprises a combined stream including a first stream having a first bandwidth and including a second stream having a second bandwidth. The first bandwidth is greater than the second bandwidth; the first stream is transmitted simultaneously with the second stream. During certain periods of time, the combined stream consists primarily of either the first stream or the second stream but not both so that during the certain periods the combined stream has a bandwidth which is less than or equal to the first bandwidth. The assigned bandwidth of the communications channel allocated to the combined stream is less than or equal to the first bandwidth.

In accordance with another aspect of the invention, a modulated data signal has data fields encoded thereon transmitted over a communications channel having an assigned bandwidth. The modulated data signal comprises a combined stream including a first stream having a first bandwidth and including a second stream having a second bandwidth. The first bandwidth is greater than the second bandwidth. The first stream is transmitted simultaneously with the second stream. During certain periods of time, the combined stream consists primarily (1) of a portion of the first stream having a first partial bandwidth which is less than the first bandwidth and the second stream, or (2) of a portion of the second stream having a second partial bandwidth which is less than the second bandwidth and the first stream, so that during the certain periods the combined stream has a bandwidth which is less than or equal to the first partial bandwidth plus the second bandwidth or the second partial bandwidth plus the first bandwidth, respectively. The assigned bandwidth of the communications channel allocated to the combined stream is less than or equal to the total of the first partial bandwidth and the second partial bandwidth.

In accordance with another aspect of the invention, a modulated data signal has data fields encoded thereon transmitted over a communications channel having an assigned bandwidth. The modulated data signal comprises a combined stream including: an audio stream having an audio bandwidth;

a video stream having a video bandwidth;
a file transfer stream having a file transfer bandwidth; and
a text stream having a text bandwidth.

The file transfer bandwidth is greater than the text bandwidth. The streams are transmitted simultaneously with each other. During certain periods of time, the combined stream includes primarily either the file transfer stream or the text stream but not both so that during the certain periods the combined stream has a combined bandwidth which is less than or equal to the audio bandwidth plus the video bandwidth plus the file transfer bandwidth.

In accordance with another aspect of the invention, a modulated data signal has data fields encoded thereon transmitted over a communications channel having an assigned bandwidth. The modulated data signal comprises a combined stream including: an audio stream having an audio bandwidth;

a video stream having a video bandwidth;
a file transfer stream having a file transfer bandwidth; and
a text stream having a text bandwidth.

The file transfer bandwidth is greater than the text bandwidth. The streams are transmitted simultaneously with each other. During certain periods of time, the combined stream includes primarily (1) a portion of the file transfer stream having a file transfer partial bandwidth which is less than the file transfer bandwidth and (2) a portion of the text stream having a text partial bandwidth which is less than the text bandwidth so that during the certain periods the combined stream has a combined bandwidth which is less than or equal to the audio bandwidth plus the video bandwidth plus the partial file transfer bandwidth plus the partial text bandwidth.

In accordance with another aspect of the invention, a computer readable medium has stored thereon a data structure comprising an advanced streaming format including a header including a bandwidth sharing object specifying the bandwidth for simultaneously streaming N streams as a combined stream (where N is an integer greater than 1). The bandwidth sharing object is a function of the bandwidth of each of the streams and includes a bandwidth value specified in the objects which is less than the total of the bandwidth of the N streams.

In accordance with another aspect of the invention, a modulated data signal has data fields encoded thereon which define a bandwidth of the modulated data signal. The signal is transmitted over a communications channel. The signal comprises a first data field containing descriptive information of a first stream having a first bandwidth and a second data field containing descriptive information of a second stream having a second bandwidth. The first bandwidth is greater than or equal to the second bandwidth. At least at certain times the first stream is transmitted simultaneously with the second stream. One or more additional data fields, each containing descriptive information of an additional stream having an additional bandwidth. At least at certain times the additional streams are transmitted simultaneously with the first and second stream. A bandwidth data field includes a bandwidth value indicating a designated bandwidth for simultaneously streaming the modulated data signal.

In accordance with another aspect of the invention, a method transmits an advanced streaming format video stream. The method comprises:

sending a composite stream having a plurality of component streams; and sending an object indicating the bandwidth of the composite stream which object is less than the total bandwidth of the component streams.

In accordance with another aspect of the invention, in a computer system, a method comprises:

receiving a data structure that holds multiple streams of data, the streams of data comprising samples that are stored in packets in the data structure and wherein the data structure includes bandwidth-sharing data that was stored prior to a request being transmitted by the computer system that caused the data structure to be received, wherein the bandwidth-sharing data indicates a combined bandwidth of the streams of data, wherein the combined bandwidth is a function of a bandwidth of each of the streams of data, and wherein the combined bandwidth is less than a sum of the bandwidths of the streams of data; and extracting the bandwidth-sharing data to adjust network resource requirements according to the combined bandwidth.

In accordance with another aspect of the invention, a data processing system having a source computer with a storage, a data structure and a bandwidth-sharing object. The data structure is stored in the storage for encapsulating multiple data streams into an aggregated data stream defined by the data structure. The data from the data streams are incorporated in packets prior to a request being received by the source computer to transmit the aggregated data stream to a destination computer. The bandwidth-sharing data is encapsulated in a header associated with the packets. The bandwidth-sharing data indicates a combined bandwidth of the aggregated data stream. The combined bandwidth is a function of a bandwidth of each of the data streams. The combined bandwidth is less than a sum of the bandwidths of the data streams.

In accordance with another aspect of the invention, in a computer system operable for connecting to a communications channel, a method encapsulates multiple streams of data into an aggregated data stream to be transmitted on the communications channel. The method comprises:

determining a packet size for the communications channel;

storing, on a storage device, at least one packet containing information about the aggregated data stream to form a header section in a data structure that defines the aggregated data stream;

storing, on the storage device, packets containing samples of data from the multiple data streams to form a data section in the data structure;

designating a portion of at least one packet in the data section for holding bandwidth-sharing data; and storing, on the storage device, bandwidth-sharing data in a header associated with the packets.

The bandwidth-sharing data indicates a combined bandwidth of the aggregated data stream. The combined bandwidth is a function of a bandwidth of each of the streams of data. The combined bandwidth is less than a sum of the bandwidths of the streams of data. The aggregated data stream is stored on the storage device prior to receiving a request for transmission of the aggregated data stream on the communications channel from a destination computer.

Alternatively, the invention may comprise various other methods and apparatuses.

Other features will be in part apparent and in part pointed out hereinafter.

BRIEF DESCRIPTION OF THE DRAWINGS

FIG. 1 is an exemplary timing diagram illustrating the bandwidth usage when streaming a subset of multimedia streams from an example ASF file, including a video stream $S_V$, an audio stream $S_A$, a file transfer stream $S_F$ and a text stream $S_T$ wherein the file transfer stream $S_F$ and the text stream $S_T$ are mutually exclusive. This is an example of ASF content with a set of multimedia streaming files that can employ exclusive bandwidth sharing according to the invention.

FIG. 2 is an exemplary timing diagram illustrating the bandwidth usage when streaming a subset of multimedia streams from an example ASF file, including a video stream $S_V$, an audio stream $S_A$, a file transfer stream $S_F$ and a text stream $S_T$ wherein the file transfer stream $S_F$ and the text stream $S_T$ partially overlap. This is an example of ASF content with a set of multimedia streaming files that can employ partial bandwidth sharing according to the invention.

FIG. 3 is a diagram depicting how an application using WINDOWS® brand Media Format SDK (Software Development Kit) can use the WINDOWS® brand API (Application Program Interface) to a bandwidth sharing object into an ASF file.

Corresponding reference characters indicate corresponding parts throughout the drawings.

DETAILED DESCRIPTION OF THE INVENTION

Figure 3:
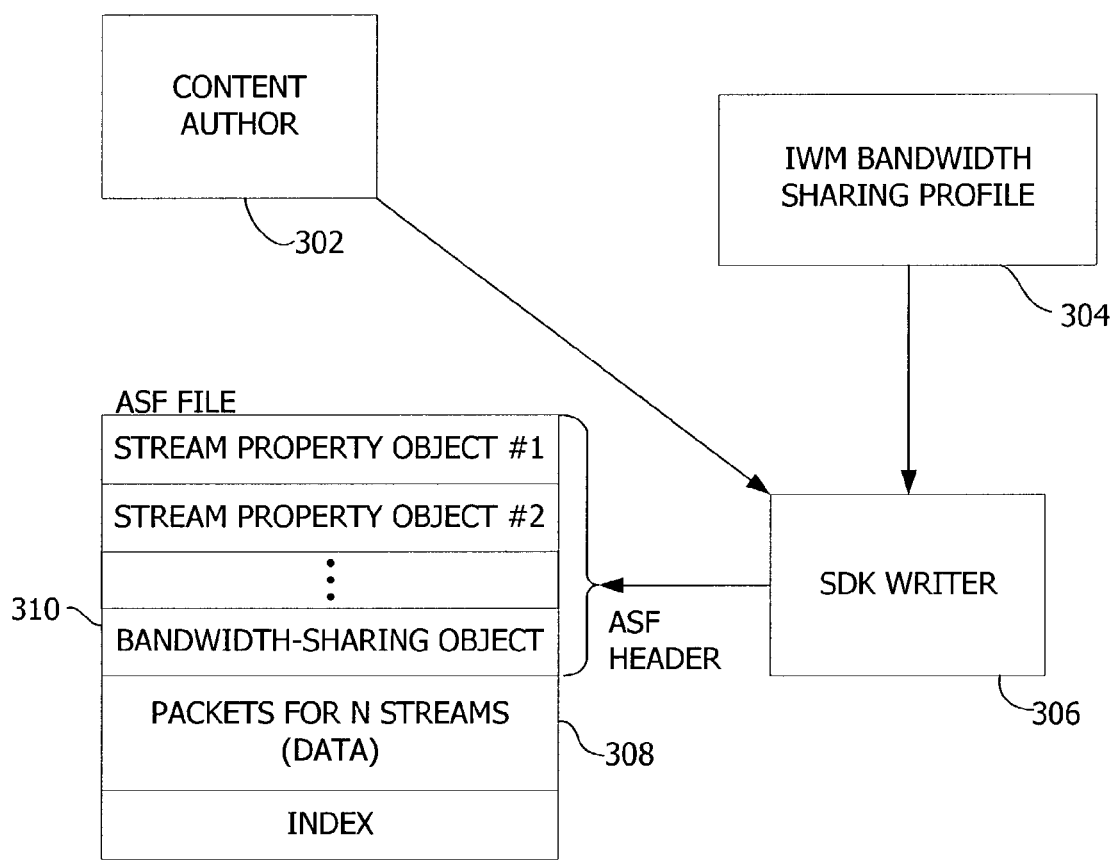
FIG. 3 is a block diagram depicting how a bandwidth sharing object according to the invention can be incorporated into an ASF file. In particular.

The invention comprises a data signal including an up-front description of the following data (a/k/a header), followed by the actual streaming data. The description section contains at least one subsection, each of which in turn contains at least four data fields. The first data field describes the bandwidth sharing type (i.e., indicates whether it's exclusive or partial bandwidth sharing, as noted below). From the second field through the second-to-last field, a stream number and the required bandwidth for that individual stream is indicated. The final field describes the bandwidth required for streaming the previously mentioned multimedia streams simultaneously. (Note that other fields throughout the description (header) will typically contain much more information about the multimedia streams, but for the purposes of this invention, only the three fields are needed). The third field will be less than the sum of the previous bandwidth fields (in order for this information to be useful). Following the description is the actual streaming data for this streaming presentation, consisting of the data for multimedia stream one and multimedia stream two. The streaming data generally comprises data for the two multimedia streams interleaved together. This is particularly true in the case of a signal having an advanced streaming format (ASF). An ASF file is defined by a bit rate $R_A$ for stream A and a buffer window $B_A$ for stream B. Together these quantities generally describe the network resources required for streaming all of the streams in that ASF file. Generally, one of the bandwidths of one of the streams is greater than the other and both streams and any additional streams are transmitted simultaneously. Also in the ASF header, a third (or additional) ASF object is transmitted.

The third data field includes an object (e.g., a bandwidth-sharing object) indicating the designated or needed bandwidth of the combined streams (e.g., a bandwidth). The object is a function of the bandwidth of each of the streams. However, the bandwidth of the combined streams as defined by the third data field is less than the total of the bandwidth of each of the streams. This is in contrast to the prior art wherein the total bandwidth of a plurality of streams was determined by summing the bandwidth of each of the streams. In order to accomplish a combined stream bandwidth which is less than the total bandwidth of the individual streams, a bandwidth sharing object is required. The amount of bandwidth that can be shared depends on the interrelationship between the various streams, as noted above.

An ASF file holds multiple data (e.g., media) streams. ASF is well suited for storage of multimedia streams as well as transmission of multiple media streams over a communications channel. ASF is constructed to encapsulate diverse multimedia streams and facilitates optimal interleaving of respective media streams. ASF specifies the packetization of data and provides flexibility in choosing packet sizes.

In general, two different types of interrelationships of the streams are possible for bandwidth sharing interrelationships. The first type of relationship is called exclusive bandwidth sharing and is illustrated in FIG. 1. FIG. 1 illustrates the bandwidth of four different streams of information: a video stream $S_V$, an audio stream $S_A$, a file transfer stream $S_F$, and a text stream $S_t$. FIG. 1 illustrates that the video bitrate (e.g. bandwidth) of the video stream $S_V$ is consistently and essentially 100 kilobits per second (kbps) after time $t_1$. It is assumed that the bandwidth needed for the video stream $S_V$ actually will vary between 0 and 100 kbps, 100 kbps being an exemplary indication of the maximum bandwidth. For the most part, the amount of bandwidth needed to transmit the video stream would be about the same and would consistently be about a bandwidth of 100 kbps. (Similarly, the audio bandwidth $S_A$ would consistently require a bandwidth of 50 kbps after time $t_1$.)

However, it is possible that the bandwidth needed for the file transfer stream $S_F$ and the text stream $S_T$ may be intermittent and in fact could be configured so that these bandwidths are mutually exclusive. In other words, the two streams of information would be configured so that only one stream would require any significant bandwidth at any particular instant in time. In one embodiment, the configuration is encapsulated in a bandwidth-sharing object associated with the two streams, where the object specifies that only one stream or the other may be sent at any one time. In general, for our example, the file transfer stream $S_F$ would require a maximum bandwidth of 50 kbps and the text stream would require a maximum bandwidth of 25 kbps. However, between times $t_1$ and $t_2$ only the file transfer stream is transmitting so that the text stream requires little or no bandwidth. Similarly, between times $t_2$ and $t_3$ the file transfer stream is not transmitting whereas the text stream is transmitting so that only bandwidth for the text stream is required. The periods between $t_3$ and $t_4$, $t_5$ and $t_6$, and after $t_8$ are also periods of time when only the file transfer stream is being transmitted and the text transfer stream is not. On the other hand, the times between $t_2$ and $t_3$, $t_4$ and $t_5$, and $t_6$ and $t_7$ are periods of time when the text transfer stream is being transmitted and the file transfer stream is not. The period of time between $t_7$ and $t_8$ is an illustration of a period of time when neither the file transfer stream nor the text stream is being transmitted. With respect to the file transfer and text streams, it can be seen according to the illustration in FIG. 1 that during certain periods of time of transmission, the composite modulated data ASF signal consists primarily of either the file transfer stream or the text stream but not both.

In the past, the bandwidth of a composite data stream such as illustrated in FIG. 1 would be calculated by summing the total bandwidth needed for each of the streams. Thus, the video stream $S_V$ requires a bandwidth of 100 kbps, the audio stream $S_A$ requires 50 kbps, the file transfer stream $S_F$ requires 50 kbps and the text stream $S_T$ requires 25 kbps for a total bandwidth of 225 kbps. However, because the file transfer stream $S_F$ and the text stream $S_T$ are mutually exclusive and only one stream is transmitting at a particular period in time, the actual bandwidth needed to transmit the composite signal illustrated in FIG. 1 does not exceed 200 kbps and between $t_7$ and $t_8$ is only 150 kbps. This actual bandwidth needed can be determined by summing the bandwidth needed for each of the streams at any instant in time. For example, between $t_1$ and $t_2$, the actual bandwidth needed for $S_V$ is 100 kbps, for $S_A$ is 50 kbps, for $S_F$ is 50 kbps and for $S_T$ is 0 for a composite bandwidth of 200 kbps. Between $t_2$ and $t_3$, the actual bandwidth needed for $S_V$ is 100 kbps, for $S_A$ is 50 kbps, for $S_F$ is 0 and for $S_T$ is 25 kbps for a composite bandwidth of 175 kbps. Between $t_7$ and $t_8$, the actual bandwidth needed for $S_V$ is 100 kbps, for $S_A$ is 50 kbps, for $S_F$ is 0 and for $S_T$ is 0 for a composite bandwidth of 150 kbps.

In general, with regard to the streams that are mutually exclusive, one stream will have a bandwidth which is greater than or equal to the bandwidth of the other stream. In the illustration of FIG. 1, the file transfer stream $S_F$ has greater bandwidth requirements than the text transfer stream $S_t$. However, it is contemplated that the streams may require the same bandwidth. As a result, the actual bandwidth needed for the composite signal with respect to the file transfer stream and the text stream is less than the bandwidth of the greater of the two which, in this case, is the bandwidth of 50 kbps for the file transfer stream.

FIG. 2 illustrates another form of the invention referred to as partial bandwidth sharing. In this illustration, there is once again shown a video stream $S_V$ requiring a bandwidth of 100 kbps and an audio stream $S_A$ requiring a bandwidth of 50 kbps. In addition, the file transfer stream $S_F$ has a maximum bandwidth requirement of 50 kbps that varies as illustrated. Also, the text stream $S_T$ has a maximum bandwidth of 50 kbps that varies as illustrated. In general, it is contemplated that the file transfer and text streams may be configured as illustrated or this configuration may be the result of a particular type of file. In either case, it can be noted that during most periods of time when the file transfer bandwidth is at a maximum of 50 kbps, the bandwidth of the text stream is not at a maximum. Conversely, it can be noted that during most periods of time when the text stream bandwidth is at a maximum of 50 kbps, the file transfer stream is not at a maximum bandwidth. Thus, this arrangement suggests that partial sharing of the bandwidth between the file transfer and text streams is available because the streams take turns streaming at their respective maximum bitrates. In particular, between times $t_{10}$ and $t_{11}$ when the file transfer stream requires a maximum bandwidth of 50 kbps, the text stream requires a bandwidth of 50 kbps. This is an unusual period when both streams are at a maximum. However, after time $t_1$ this simultaneous maximum does not occur. For example, between times $t_{14}$ and $t_{15}$ when the file transfer stream requires a maximum bandwidth of 50 kbps, the text stream requires a lesser bandwidth of 12.5 kbps. Between $t_{13}$ and $t_{14}$ the text stream requires a maximum bandwidth of 50 kbps whereas the file transfer stream does not require any bandwidth. The same configuration appears between times $t_{17}$ and $t_{18}$. Thus, the actual bandwidth needed by summing the needed bandwidth at any instant in time indicates that the maximum needed is 212.5 kbps between times $t_{11}$ and $t_{19}$. On the other hand, the total bandwidth that could be needed by such a combined stream would be 250 kbps by summing the maximum bandwidth of each of the streams. In other words, partial bandwidth sharing can be employed when, during certain periods of time of transmission of the combined stream, the stream primarily includes a portion of the file stream and a portion of the text stream wherein the actual bandwidth needed is less than or equal to the sum of the first partial bandwidth and the second partial bandwidth. In other words, the bandwidth sharing object would be equal to the maximum of the file transfer stream bandwidth and the text stream bandwidth at any instant in time. This maximum is illustrated as the actual bandwidth needed and is equal to 212.5 kbps between the period of $t_{11}$ and $t_{19}$.

It is also contemplated that the actual bandwidth assigned or allocated to a particular combined stream or communications channel could be less than needed to cover any and every instant in time. For example, with particular regard to FIG. 2, it is noted that the maximum bandwidth needed is 212.5 kbps except for the period of time between $t_{10}$ and $t_{11}$. Thus, a decision could be made to specify that the bandwidth sharing object be equal to the substantial maximum of the actual bandwidth needed of 212.5 kbps as opposed to the absolute maximum of 250 kbps. Thus, for the period between $t_{10}$ and $t_{11}$, the allocated bandwidth would be slightly less than required resulting in a degraded presentation to the user. This compromise is considered by the user to be acceptable. A similar compromise could be made with respect to the exclusive bandwidth sharing scenario illustrated in FIG. 1.

In general, in one form of the invention, a modulated data signal having data fields encoded which define a bandwidth of the modulated data signal is indicated. The signal is transmitted over a communications channel which is preferably assigned or allocated a bandwidth equal to the bandwidth indicated by the modulated data signal. The modulated data signal will include an initial description, containing data fields specifying the bandwidths of multimedia streams. Following the initial description, the modulated data signal will include the actual data for the two or more multimedia streams.

In general, the first bandwidth would be greater than or equal to the second bandwidth and the streams would be transmitted simultaneously along with one or more additional streams defined in additional data fields. Each additional stream carries additional information and each of the additional streams has an additional bandwidth requirement. The initial description, contained in the data signal, includes a bandwidth data field including an object indicating the bandwidth of the modulated data signal. This object is a function of the bandwidth of the streams and, in accordance with the invention, is less than the total of the bandwidth requirements of the streams.

FIG. 3 is a block diagram depicting how bandwidth sharing objects may be provided in an ASF file. As will be described in greater detail below, the content author 302 specifies a relationship between an IWM profile 304 which is provided to a software development kit (SDK) writer. (In this example, the content author is actually an application which uses the WINDOWS® brand Media Format SDK at the request of an end user.) See Appendix A for a list and discussion of routines available in an exemplary SDK according to the invention. At 306, the SDK writer translates the information into an ASF header object which is added to the ASF file 308. Thus, in one form, the invention comprises a computer-readable media storing a data structure. The data structure is an ASF file or some other structure in ASF or another format which includes a header with a bandwidth sharing object 310. As noted above, the bandwidth sharing object specifies the bandwidth for simultaneously streaming the N streams as a combined stream. In general, N is an integer greater than 1. In accordance with certain aspects of the invention as noted above, the bandwidth specified in the bandwidth sharing object 310 is a function of the bandwidth of each of the streams and is less than the total bandwidth of the streams. The actual definition of the bandwidth may vary dependent upon whether or not some of the streams (such as M streams where M is an integer less than N) within the combined stream are mutually exclusive as illustrated in FIG. 1 or partially overlapping as illustrated in FIG. 2. The bandwidth sharing object may also indicate whether it is describing exclusive or partial bandwidth sharing.

The following is a description of how a content-authoring application (referred to below as the "author") would use the SDK to add bandwidth-sharing to an ASF file.

Conceptually, bandwidth-sharing is a part of an ASF profile used for encoding. The author specifies many different characteristics for the content such as a listing of streams and their desired characteristics (stream type, bit rate, etc) and a listing of the various relationships among those streams. Bandwidth sharing belongs in the ASF profile because bandwidth-sharing is an inter-stream relationship.

As part of its application programming interface (API), the SDK provides an interface such as IWMProfile (as well as IWMProfile2 and IWMProfile3) as an abstraction with which the author can manipulate the profile. Content authors can develop a profile for encoding in one of three ways: (1) by building one from scratch using the IWMProfile interface; or (2) by opening an ASF file with an SDK reader and obtaining the profile from a profile reader (e.g., IWMReader); or (3) by loading a previously-created profile that was stored as XML on the local disk via a profile manager interface (e.g., IWMProfileManager). A content author can also obtain a profile in either of the last two ways mentioned and subsequently manipulate it using the API. Bandwidth-sharing relationships can be expressed by the content author in the encoding profile in any of the above ways.

In order to add a bandwidth-sharing relationship to an existing profile via the IWMProfile interface, the author follows a procedure such as the exemplary procedure next described. The author calls IWMProfile3::CreateNewBandwidthSharing( ) to get an instance of IWMBandwidthSharing. The author calls IWMBandwidthSharing::SetType( ) to set the type to exclusive bandwidth sharing (it can also be set to partial bandwidth sharing). In this example, this would be the GUID (Globally Unique IDentifier) for exclusive bandwidth sharing. The author also calls IWMBandwidthSharing::SetBandwidth( ) to set the network resources ($R_{BS}$ and $B_{BS}$) needed for the streams in the bandwidth-sharing relationship according to the author's knowledge of the characteristics of this stream. For each stream in the relationship, the author calls IWMBandwidthSharing::AddStream( ). The author calls IWMProfile3::AddBandwidthSharing( ) with the IWMBandwidthSharing interface pointer. The author calls IWMWriter::SetProfile with the IWMProfile interface pointer.

Those skilled in the art will appreciate that the invention is not limited to the procedure or the routines specified in the above exemplary procedure. It is contemplated by the inventors that other procedures and routines for adding bandwidth-sharing to a profile not specifically described herein are within the scope of the invention. For example, and as described herein, the bandwidth-sharing object may be created and inserted into an ASF file when the ASF file is created. Alternatively, the bandwidth-sharing object may be created and inserted into an ASF file as a post-processing step after the ASF file has been created. In an another example, the bandwidth-sharing object is created and inserted in a streaming ASF file dynamically. In such an embodiment, the audio and video compressors-decompressors communicate their changing bandwidth needs dynamically.

At this point, the author proceeds with encoding as usual. The author may persist this profile to disk as XML using IWMProfileManager. If accessed later, the IWMProfile will already specify this bandwidth-sharing relationship.

While encoding, the SDK writer stores this information in the ASF file it is writing as a bandwidth-sharing object (BSO). The BSO is an object in the ASF header that precedes the data in ASF files. The generation of the ASF header occurs at the beginning of encoding in a component of the writer called the multiplexer, and this is where BSOs get added to the header as well. An exemplary format of the BSO is shown and explained in Table A below.

Upon opening this file for streaming, a media server can parse this ASF header object and get information about the bandwidth-sharing relationship for use in the stream selection process. The stream selection process usually involves considering various subsets of the set of streams in a particular ASF file and comparing the total bandwidth needed for that subset against what resources are currently available for streaming. When determining what bandwidth is needed for a particular subset of the streams, if all streams for a particular BSO are present, then the server should use $R_{BS}$ as the bandwidth required for those streams rather than simply adding up the values of R across those streams. Thus, the BSO is used to obtain a more optimal subset of the multimedia streams in the streaming file.

Bandwidth-Sharing Quantities

As noted above, there are two quantities associated with a bandwidth-sharing relationship in an ASF file: the bit rate $R_{BS}$ and the buffer window $B_{BS}$. Together, these quantities should accurately describe the network resources required for streaming all of the streams in that relationship. Of course, specifying the bandwidth-sharing relationship is useful when $R_{BS}$ is less than the sum of R over all of those streams.

As described herein, bit rate and buffer window describe the streaming properties of a stream as a pair. Depending on the burstiness of a particular stream, the bit rate can be reduced if the buffer window is increased sufficiently. A given stream can be streamed with various bit rate and buffer window combinations, so these values are not uniquely determined for a certain stream.

For exclusive bandwidth sharing relationships, such as the one illustrated in FIG. 1, $R_{BS}$ would be the "actual" bandwidth needed over all streams in the relationship, as noted above. Since exclusive bandwidth sharing means that only one stream is active at any instant in time, the "actual" bandwidth needed at a particular time is equal to the bandwidth of the stream that is active at that particular time. Over a period of time when multiple streams are active, one at a time, the "actual" bandwidth needed during the period of time is equal to the maximum of the bandwidths of each stream. (See FIG. 2). Depending on the qualities of the particular set of streams, sensible values for $B_{BS}$ can range from the max B over all the streams to the sum of B over all the streams. More than $B_{MAX}$ may be required to handle cases when the various streams' different buffers are all relatively full at a given point in time.

For partial bandwidth sharing, $R_{BS}$ would be less than the sum of R over the streams in the relationship, as noted above with regard to FIG. 2. The same holds for $B_{BS}$.

TABLE A

Exemplary Format of the ASF Bandwidth-Sharing object

| Field Name | Field Type | Size (bits) |
|---|---|---|
| Object ID | GUID | 128 |
| Object Size | QWORD | 64 |
| Sharing Type | GUID | 128 |
| Data Bit Rate | DWORD | 32 |
| Buffer Size | DWORD | 32 |
| Stream Numbers Count | WORD | 16 |
| Stream Numbers | WORD | ? |

The object ID field specifies a globally unique identifier (GUID) for the bandwidth sharing object. In one embodiment, the value of this field is set to ASF_Bandwidth_Sharing_Object. The object size field specifies the size in bytes of the bandwidth sharing object. In one embodiment, valid values are larger than 50 bytes. The sharing type field specifies the type of sharing relationship for this object. Two types are predefined: PARTIAL, in which any number of the streams in the relationship may be streaming data at any given time (see FIG. 2), and EXCLUSIVE, in which only one of the streams in the relationship may be streaming data at any given time (see FIG. 1). The data bit rate field specifies the leak rate in bits per second of a leaky bucket that contains data without overflowing the data portion of any of the streams, excluding all ASF data packet overhead. This is the nominal bit rate used by the encoder's rate control algorithm. If this field is 0, then the data bit rate is equal to the largest maximum data bit rate among all the streams in this relationship. The buffer size field specifies the size in bits of the leaky bucket used in the data bit rate field. This is the size of the buffer used by the encoder's rate control algorithm. If the data bit rate field is 0, then the buffer size value to be used is the value of the stream with a data bit rate equal to the largest maximum data bit rate among all the streams in the relationship. The stream numbers count field specifies the number of entries in the stream numbers field. The stream numbers field specifies the list of media streams in a bandwidth sharing relationship with the others. In one embodiment, valid values are between 1 and 127.

Figure 4:
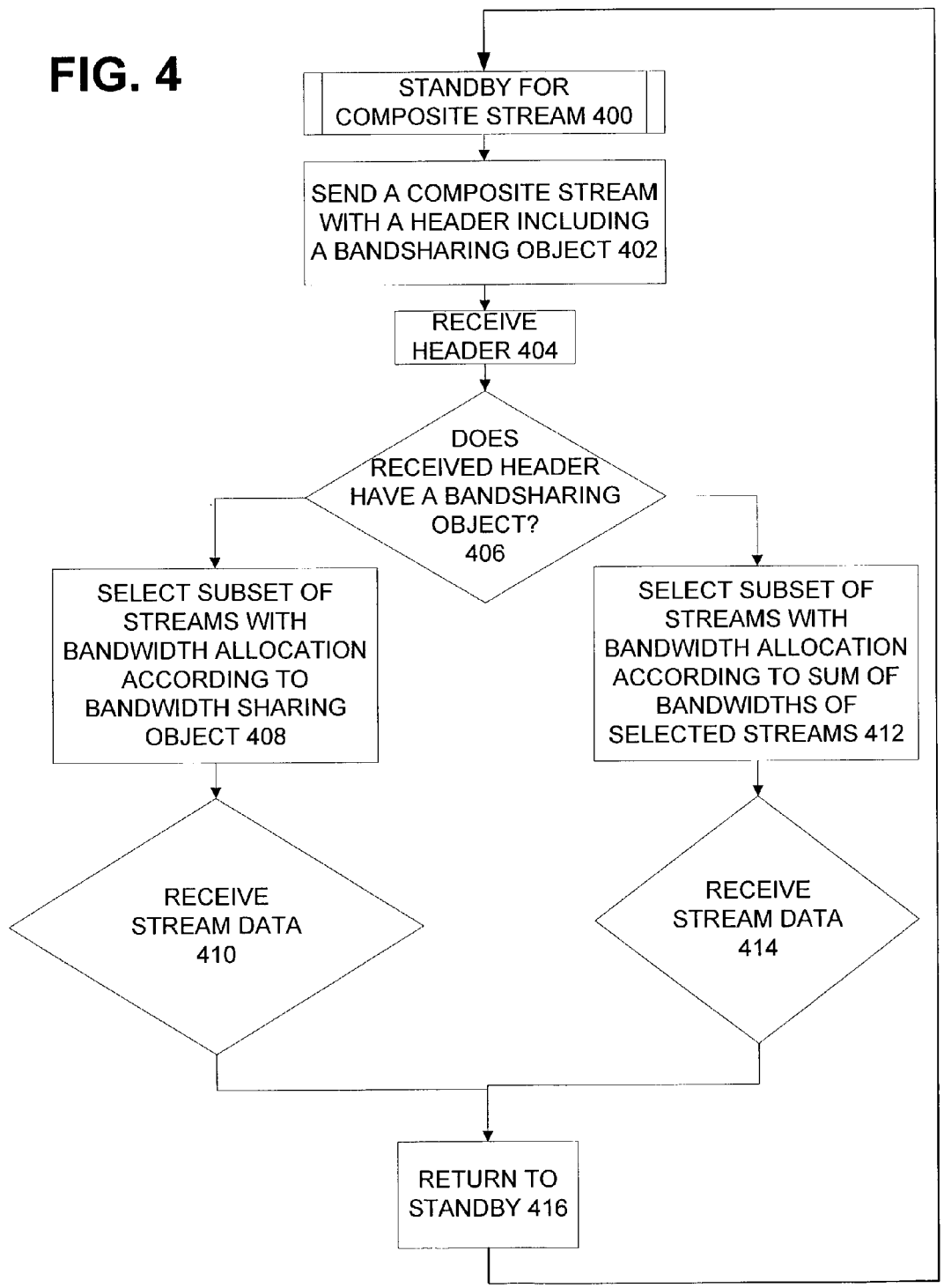
FIG. 4 is a flow chart illustrating a method of transmitting and receiving ASF files, some of which include bandwidth sharing objects.

FIG. 4 illustrates a method of transmitting an ASF video stream according to the invention. Initially at 400, the system is in a standby mode waiting for a command from an operator or other source to begin the transfer. After a "begin transfer" command is received, the header is transmitted from a source system to a destination system at 402. Included in the header is a bandwidth sharing object indicating the bandwidth that should be allocated or assigned to a specified subset of the streams by the receiving system. The object specifies that less bandwidth is needed than the total sum of the bandwidths of the subset of streams. One or more destination computer systems receives the composite stream with header at 404. At 406, the receiving system looks to the received header to determine whether the header has a bandwidth sharing object (BSO). At 408 or 412, the receiving system selects a subset of streams from the composite stream based on the available based on the available bandwidth of the communications channel. If a BSO is present, at 408, the subset of streams will have a total bandwidth associated with it, equal to the sum of bandwidths of any selected streams not in a BSO, plus the sum of bandwidths of any BSOs with streams selected in the given subset. This total bandwidth will be less than or equal to the available bandwidth of the communications channel. At 410, the receiving system will receive the data from the selected subset of streams. If the header does not have a BSO, the subset of streams at 412 will have a total bandwidth associated with it, equal to the sum of the bandwidths of the selected streams. This total bandwidth will be less than or equal to the available bandwidth of the communications channel. The receiving system then receives the subset of streams without reduced bandwidth allocation at 414. The system then returns to standby at 416.

Figure 5:
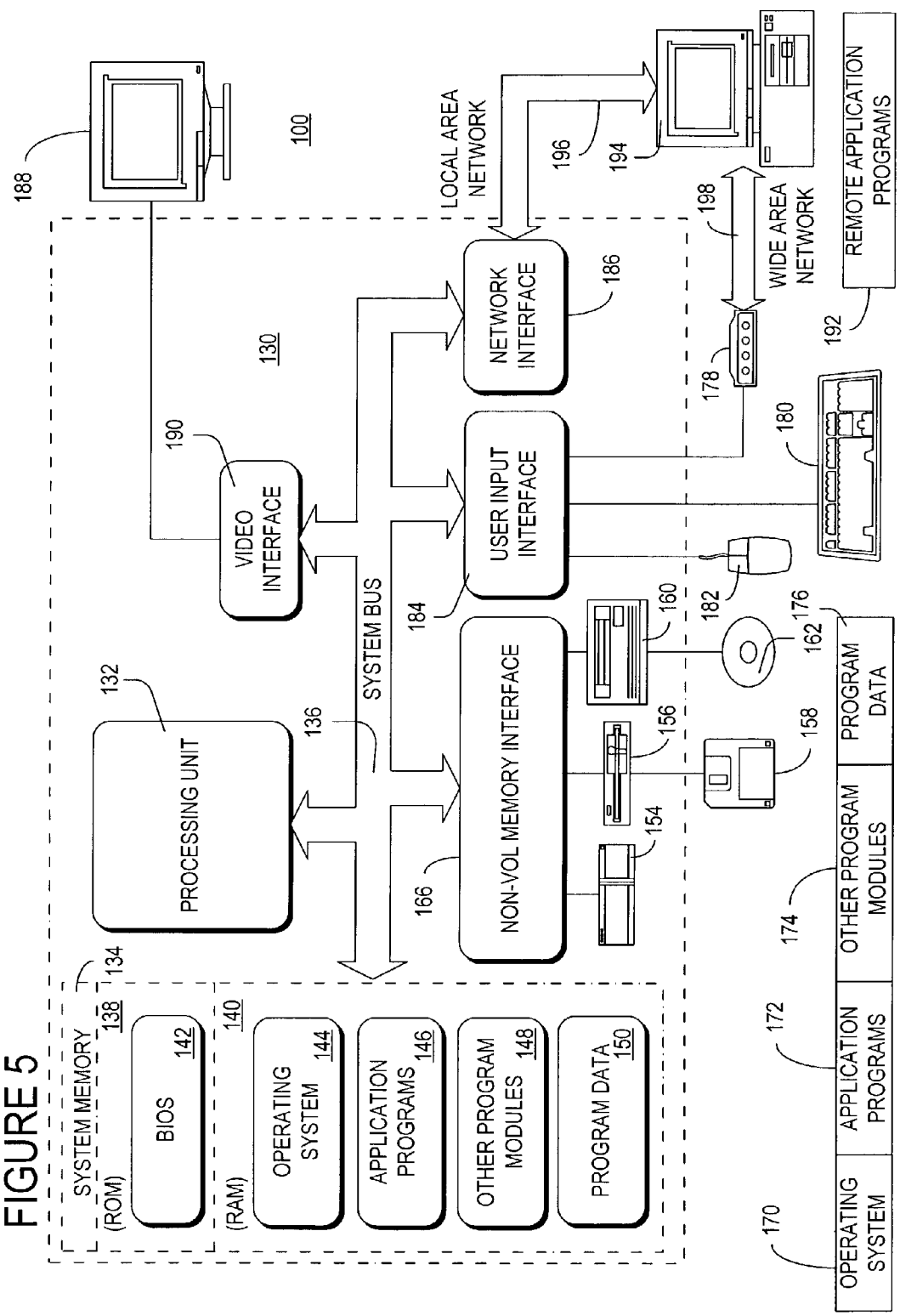
FIG. 5 is a block diagram illustrating one example of a suitable computing system environment on which the invention may be implemented.

FIG. 5 shows one example of a general purpose computing device in the form of a computer 130 for transmitting and/or receiving an ASF with a BSO according to the invention. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/ or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 5 illustrates operating system 144, application programs 146, other program modules 148, and program data 150.

The computer 130 may also include other removable/non-removable, volatile/nonvolatile computer storage media. For example, FIG. 5 illustrates a hard disk drive 154 that reads from or writes to non-removable, nonvolatile magnetic media. FIG. 5 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 5, provide storage of computer readable instructions, data structures, program modules and other data for the computer 130. In FIG. 5, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 5 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 5 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

The following is an example of an ASF file that can make use of bandwidth sharing. This example will be referred to in the following section for the purpose of illustration.

Consider an ASF file containing an audio-video presentation that is accompanied by a file transfer stream and a text stream. The four streams are referred to as $S_A$, $S_V$, $S_F$, and $S_T$ to indicate the audio, video, file-transfer, and text streams, respectively. The respective stream numbers are 1, 2, 3, and 4. Each stream has its own streaming requirements of bit rate R and buffer window B, which we will refer to as $R_A$, $B_A$, etc. Suppose that (R, B) for the four streams are, respectively ($R_A$, $B_A$)=(10168, 3000), ($R_V$, $B_V$)=(16000, 3000), ($R_F$, $B_F$)=(5000, 6000), ($R_T$, $B_T$)=(1000, 3000), where values for R are given in bits per second (bps), and values for B are given in milliseconds.

Once this content has been created, assuming that there are no bandwidth-sharing relationships specified by the author, a server can safely assume that the amount of bandwidth needed to stream all four streams is 10168+16000+5000+1000=32168 bps.

The author knows that $S_F$ and $S_T$ are never actively streaming data at the same time (i.e., the streams take turns). This relationship between the two streams is exclusive bandwidth sharing as discussed above. Partial bandwidth sharing, also discussed above, refers to a situation in which two or more streams do not necessarily take turns streaming, but nevertheless together require bandwidth less than the sum of the streams' bandwidths. FIG. 1 is a visual representation of the streaming behavior of exclusive bandwidth sharing and FIG. 2 of partial bandwidth sharing.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

Appendix A

The following routines exemplify a software development kit according to the invention.

IWMBandwidthSharing Interface

A IWMBandwidthSharing interface contains methods to manage the properties of combined streams. The list of streams that will share bandwidth is stored in the bandwidth sharing object. They can be manipulated using the methods of the IWMStreamList interface. IWMBandwidthSharing inherits from IWMStreamList, so the stream list manipulation methods are always exposed through this interface. The information in a bandwidth sharing object is purely informational. There is no logic in the SDK that seeks to enforce or check the accuracy of the bandwidth specified. You might want to use bandwidth sharing so that a reading application can make adjustments based on the information contained in the bandwidth sharing object. An IWMBandwidthSharing interface is exposed for each bandwidth sharing object upon creation. Bandwidth sharing objects are created using the IWMProfile3::CreateNewBandwidthSharing method. In addition to the methods inherited from IWMStreamList, the IWMBandwidthSharing interface exposes the following methods.

| Method | Description |
| --- | --- |
| GetBandwidth | Retrieves the bandwidth and maximum buffer size of the streams in the bandwidth sharing object. |
| GetType | Retrieves the type of sharing (exclusive or partial) for the bandwidth sharing object. |
| SetBandwidth | Sets the bandwidth and maximum buffer size for streams in the bandwidth sharing object. |
| SetType | Sets the type of sharing (exclusive or partial) for the bandwidth sharing object. |

IWMBandwidthSharing::GetBandwidth

The GetBandwidth method retrieves the bandwidth and maximum buffer size of a combined stream.

```
Syntax
HRESULT GetBandwidth(
    DWORD* pdwBitrate,
    DWORD* pmsBufferWindow
);
```

Parameters pdwBitrate

[out] Pointer to a DWORD containing the bit rate in bits per second. The combined bandwidths of the streams cannot exceed this value.

pmsBufferWindow

[out] Pointer to DWORD containing the buffer window in milliseconds. The combined buffer sizes of the streams cannot exceed this value.

Return Values

If the method succeeds, it returns S_OK. If it fails, possible return codes include, but are not limited to, the values shown in the following table.

| Return code | Description |
| --- | --- |
| E_INVALIDARG | One or both of the parameters are NULL. |

Remarks

The settings of a bandwidth sharing object are purely informational. The SDK does not check them for accuracy.

IWMBandwidthSharing::GetType

The GetType method retrieves the type of sharing for the bandwidth sharing object.

```
Syntax
HRESULT GetType(
    GUID* pguidType
);
```

Parameters pguidType

[out] Pointer to a globally unique identifier specifying the type of combined stream to be used. This will be one of the following values.

| Bandwidth sharing type | Description |
| --- | --- |
| CLSID_WMBandwidthSharing_Exclusive | Only one of the constituent streams can be active at any given time. |
| CLSID_WMBandwidthSharing_Partial | The constituent streams can be active simultaneously. |

Return Values

If the method succeeds, it returns S_OK. If it fails, possible return codes include, but are not limited to, the values shown in the following table.

| Return code | Description |
| --- | --- |
| E_INVALIDARG | The pointer passed is NULL. |

Remarks

The settings of a bandwidth sharing object are purely informational. The SDK does not check them for accuracy.

IWMBandwidthSharing::SetBandwidth

The SetBandwidth method sets the bandwidth and maximum buffer size for a combined stream.

```
Syntax
HRESULT SetBandwidth(
    DWORD dwBitrate,
    DWORD msBufferWindow
);
```

Parameters dwBitrate

[in] DWORD containing the bit rate in bits per second. The combined bandwidths of the streams cannot exceed this value.

msBufferWindow

[in] Specifies the buffer window in milliseconds. The combined buffer sizes of the streams cannot exceed this value.

Return Values

This method always returns S_OK.

Remarks

The settings of a bandwidth sharing object are purely informational. The SDK does not check them for accuracy.

IWMBandwidthSharing::SetType

The SetType method sets the type of sharing (exclusive or partial) for the bandwidth sharing object.

```
Syntax
HRESULT SetType(
    REFGUID guidType
);
```

Parameters guidType

[in] A globally unique identifier specifying the type of combined stream to be used. The only valid GUIDs that can be passed are those in the following table.

| Bandwidth sharing type | Description |
| --- | --- |
| CLSID_WMBandwidthSharing_Exclusive | Only one of the constituent streams can be active at any given time. |
| CLSID_WMBandwidthSharing_Partial | The constituent streams can be active simultaneously. |

Return Values

If the method succeeds, it returns S_OK. If it fails, possible return codes include, but are not limited to, the values shown in the following table.

| Return code | Description |
| --- | --- |
| E_INVALIDARG | The GUID passed in guidType is any value other than CLSID_BandwidthSharingExclusive or CLSID_BandwidthSharingPartial. |

Remarks

The settings of a bandwidth sharing object are purely informational. The SDK does not check them for accuracy.

IWMProfile3::AddBandwidthSharing

The AddBandwidthSharing method adds an existing bandwidth sharing object to the profile. Bandwidth sharing objects are created with a call to IWMProfile3::CreateNewBandwidthSharing. You must configure the bandwidth sharing object before adding it to the profile.

```
Syntax
HRESULT AddBandwidthSharing(
    IWMBandwidthSharing* pBS
);
```

Parameters pBS

[in] Pointer to the IWMBandwidthSharing interface of a bandwidth sharing object.

Return Values

If the method succeeds, it returns S_OK. If it fails, possible return codes include, but are not limited to, the values shown in the following table.

| Return code | Description |
| --- | --- |
| E_INVALIDARG | pBS is NULL. OR The bandwidth sharing object has a bandwidth sharing type value that is not valid. |
| E_UNEXPECTED | An unknown error occurred while adding the bandwidth sharing object to the internal collection in the profile. |
| E_OUTOFMEMORY | The method was unable to allocate memory. |

-continued

| Return code | Description |
|---|---|
| NS_E_NO_STREAM | The bandwidth sharing object contains no streams. |

Remarks

Making a call to AddBandwidthSharing without first using the methods of IWMBandwidthSharing to configure the bandwidth sharing object will result in an error.

IWMProfile3::CreateNewBandwidthSharing

The CreateNewBandwidthSharing method creates a new bandwidth sharing object.

```
Syntax
HRESULT CreateNewBandwidthSharing(
    IWMBandwidthSharing** ppBS
);
```

Parameters ppBS

[out] Pointer to receive the address of the IWMBandwidthSharing interface of the new object.

Return Values

If the method succeeds, it returns S_OK. If it fails, possible return codes include, but are not limited to, the values shown in the following table.

| Return code | Description |
|---|---|
| E_INVALIDARG | ppBS is NULL. |
| E_OUTOFMEMORY | The method is unable to allocate memory for the new object. |

Remarks

In order to make use of the bandwidth sharing object, you must add it to the profile with a call to IWMProfile3::AddBandwdithSharing. A bandwidth sharing object cannot exist on its own. If you release the profile object without adding the bandwidth sharing object to the profile, you will lose the bandwidth sharing object.

You must configure the bandwidth sharing object before you use IWMProfile3::AddBandwdithSharing to include the bandwidth sharing object in the profile. For more information about configuring bandwidth sharing objects, see the IWMBandwidthSharing interface section.

Bandwidth Sharing Objects

Bandwidth sharing objects are used to indicate that two or more streams, regardless of their individual bit rates, will never use more than a specified amount of bandwidth between them. This is a purely informational object, and is not enforced programmatically by any feature of this SDK.

Bandwidth sharing information is an optional part of a profile. Bandwidth sharing objects may be created for existing bandwidth sharing information in a profile or may be created empty, ready to receive new data. Bandwidth sharing objects cannot exist independently of a profile object. To save the contents of a bandwidth sharing object, you must call IWMProfile3::AddBandwidthSharing.

To create a bandwidth sharing object, call one of the following methods.

| Method | Description |
|---|---|
| IWMProfile3::CreateNewBandwidthSharing | Creates a bandwidth sharing object without any data. |
| IWMProfile3::GetBandwidthSharing | Creates a bandwidth sharing object populated with data from a profile. Uses the bandwidth sharing index to identify the desired bandwidth sharing information. |

Both methods in the preceding table set a pointer to an IWMBandwidthSharing interface. The IWMStreamList interface is inherited by IWMBandwidthSharing, so there is no need to call QueryInterface with this object.

The following interfaces are supported by every bandwidth sharing object.

| Interface | Description |
|---|---|
| IWMBandwidthSharing | Manages the properties of a group of streams that will share bandwidth. |
| IWMStreamList | Manages the list of streams that will share bandwidth. |

Remarks

The reader object and the synchronous reader object both support IWMProfile, IWMProfile2, and IWMProfile3. You can also access bandwidth sharing objects that are part of a file loaded into the reader.

Bandwidth Sharing Types

You can use bandwidth sharing types to identify the nature of a bandwidth sharing object in a profile. Bandwidth sharing types are used as parameters for IWMBandwidthSharing::GetType and IWMBandwidthSharing::SetType.

The following table lists the identifiers for bandwidth sharing types.

| Bandwidth sharing type constant | GUID |
|---|---|
| CLSID_WMBandwidthSharing_Exclusive | AF6060AA-5197-11D2-B6AF-00C04FD908E9 |
| CLSID_WMBandwidthSharing_Partial | AF6060AB-5197-11D2-B6AF-00C04FD908E9 |

IWMProfile3::GetBandwidthSharing

The GetBandwidthSharing method retrieves a bandwidth sharing object from a profile.

```
Syntax
HRESULT GetBandwidthSharing(
    DWORD dwBSIndex,
    IWMBandwidthSharing** ppBS
);
```

Parameters dwBSIndex

[in] DWORD containing the index number of the bandwidth sharing object you wish to retrieve.

ppBS

[out] Pointer to receive the address of the IWMBandwidthSharing interface of the object requested.

Return Values

If the method succeeds, it returns S_OK. If it fails, possible return codes include, but are not limited to, the values shown in the following table.

| Return code | Description |
| --- | --- |
| E_INVALIDARG | ppBS is NULL.<br>OR<br>dwBSIndex refers to an invalid index number. |
| E_OUTOFMEMORY | The method is unable to allocate memory for the bandwidth sharing object. |

Remarks

Bandwidth sharing objects in a profile are assigned sequential index numbers in the order in which they were added to the profile. When you create multiple bandwidth sharing objects for a profile, you should keep track of the contents of each one. Otherwise you will have to examine each one to ascertain its settings.

IWMProfile3 Interface

The IWMProfile3 interface provides enhanced features for profiles. This includes the ability to create two new types of objects: bandwidth sharing objects and stream prioritization objects.

An IWMProfile3 interface is created for each profile object created. You can retrieve a pointer to an IWMProfile3 interface by calling the QueryInterface method of any other interface of the profile. You can also access IWMProfile3 from a reader or synchronous reader object by calling the QueryInterface method of an existing interface in the object. Another way to obtain an IWMProfile is via the IWMProfileManager.

In addition to the methods inherited from IWMProfile2, the IWMProfile3 interface exposes the following methods.

| Method | Description |
| --- | --- |
| AddBandwidthSharing | Adds an existing bandwidth sharing object to the profile. |
| CreateNewBandwidthSharing | Creates a new bandwidth sharing object. |
| CreateNewStreamPrioritization | Creates a new stream prioritization object. |
| GetBandwidthSharing | Obtains a pointer to the IWMBandwidthSharing interface of an existing bandwidth sharing object. |
| GetBandwidthSharingCount | Retrieves the number of bandwidth sharing objects that exist in the profile. |
| GetExpectedPacketCount | Retrieves the expected number of packets for a specified duration. |
| GetStorageFormat | Retrieves the file format for which the profile is configured. |
| GetStreamPrioritization | Retrieves the stream prioritization object associated with the profile. |
| RemoveBandwidthSharing | Removes a bandwidth sharing object from the profile. |
| RemoveStreamPrioritization | Removes a stream prioritization object from the profile. |
| SetStorageFormat | Sets the file format to be used with the profile. |
| SetStreamPrioritization | Assigns a stream prioritization object to the profile. |

IWMProfile3::RemoveBandwidthSharing

The RemoveBandwidthSharing method removes a bandwidth sharing object from the profile. If you do not already have a pointer to the IWMBandwidthSharing interface of the object you want to remove, you must obtain one with a call to IWMProfile3::GetBandwidthSharing.

```
Syntax
HRESULT RemoveBandwidthSharing(
    IWMBandwidthSharing* pBS
);
```

Parameters pBS

[in] Pointer to a bandwidth sharing object.

Return Values

If the method succeeds, it returns S_OK. If it fails, possible return codes include, but are not limited to, the values shown in the following table.

| Return code | Description |
| --- | --- |
| E_INVALIDARG | pBS is NULL.<br>OR<br>The bandwidth sharing object pointed to by pBS is not part of the profile. |

Remarks

This method does not release the bandwidth sharing object from memory. You must make a call to the Release method.

IWMStreamList Interface

The IWMStreamList interface is used by mutual exclusion objects and bandwidth sharing objects to maintain lists of streams. The IWMMutualExclusion and IWBandwidthSharing interfaces each inherit from IWMStreamList. These are the only uses of this interface in the SDK. You will never need to deal with interface pointers for IWMStreamList directly.

In addition to the methods inherited from IUnknown, the IWMStreamList interface exposes the following methods.

| Method | Description |
| --- | --- |
| AddStream | Adds a stream to the list. |
| GetStreams | Retrieves an array of stream numbers that make up the list. |
| RemoveStream | Removes a stream from the list. |

Using Custom Profiles

For any file requirement not covered by one of the system profiles, you must create a custom profile because bandwidth sharing is not covered by any presently available profiles. You can create a custom profile by loading an existing profile and manipulating it, or you can create an empty profile and add all of the required information yourself.

Use the following steps to create an entirely new profile.

1. Create a profile manager by calling the WMCreateProfileManager function.
2. Create a new empty profile by calling IWMProfileManager::CreateEmptyProfile.
3. Give your new profile a name and description with calls to IWMProfile::SetName and IWMProfile::SetDescription respectively.
4. Add streams to the new profile by calling IWMProfile:: CreateNewStream. Configure the streams as needed by using the methods of IWMStreamConfig. You can also call QueryInterface to access other interfaces in the stream configuration object.

The settings that you use for your streams will determine the quality of the output streams of the finished file. The writer will use information about streams from the profile to determine which codec to use to compress the data in the stream.

5. Create mutual exclusion objects, if needed, by calling IWMProfile::CreateNewMutualExclusion.

Add streams to each mutual exclusion object by making calls to IWMStreamList::AddStream (available directly from IWMMutualExclusion, which inherits from IWMStreamList).

Set the type of each mutual exclusion object by calling IWMMutualExclusion:: SetType.

Add the mutual exclusion objects to the profile with calls to IWMProfile::AddMutualExclusion.

6. Create bandwidth sharing objects, if needed, by calling IWMProfile3::CreateNewBandwidthSharing.

Add streams to each bandwidth sharing object by making calls to IWMStreamList::AddStream (available directly from IWMBandwidthSharing, which inherits from IWMStreamList).

Use the methods of IWMBandwidthSharing to configure each bandwidth sharing object.

Add the bandwidth sharing objects to the profile with calls to IWMProfile3::AddBandwidthSharing.

7. Create a stream prioritization object, if needed, by calling IWMProfile3::CreateNewStreamPrioritization.

Create an array of WM_STREAM_PRIORITY_RECORD structures with one entry for each stream to be included in the stream prioritization. Pass the array to the stream prioritization in a call to IWMStreamPrioritization::SetPriorityRecords.

Add the stream prioritization to the profile by calling IWMProfile3::SetStreamPrioritization.

8. Save the profile to a string by calling IWMProfileManager::SaveProfile.
9. Save the profile string to a text file. Profile files are usually given the .prx extension.

The following sections describe the objects that make up a custom profile and the issues involved in configuring them.

| Section | Description |
| --- | --- |
| Configuring Streams | Discusses the issues with configuring streams as well as the settings you should use for encoding. |
| Using Mutual Exclusion | Describes how to use mutual exclusion objects in your profiles for multiple bit rate streams and other uses. |
| Using Bandwidth Sharing | Describes how to configure bandwidth sharing objects to inform reader applications about the combined bandwidth requirements of streams. |
| Using Stream Prioritization | Describes how to configure stream prioritization to inform reader applications about which streams can have samples dropped if needed. |
| Calculating Target Bandwidth | Discusses the factors for determining target bandwidth. |
| Managing Packet Size | Discusses the manual configuration of packet size. |

Interface Identifiers

You must use an interface identifier (IID) when making calls to the QueryInterface method. An IID is a globally unique identifier (GUID) value. In the WINDOWS® Media Format SDK, the constant assigned to the IID for a given interface is the interface name preceded by 'IID_'.

The following table lists the interface identifiers and associated constants for the interfaces in this SDK.

| Interface | IID constant | GUID |
| --- | --- | --- |
| IWMBackupRestoreProps | IID_IWMBackupRestoreProps | 3C8E0DA6-996F-4FF3-A1AF-4838F9377E2E |
| IWMBandwidthSharing | IID_IWMBandwidthSharing | AD694AF1-F8D9-42F8-BC47-70311B0C4F9E |
| IWMClientConnections | IID_IWMClientConnections | 73C66010-A299-41DF-B1F0-CCF03B09C1C6 |
| IWMCodecInfo | IID_IWMCodecInfo | A970F41E-34DE-4A98-B3BA-E4B3CA7528F0 |
| IWMCodecInfo2 | IID_IWMCodecInfo2 | AA65E273-B686-4056-91EC-DD768D4DF710 |
| IWMCodecInfo3 | IID_IWMCodecInfo3 | 7E51F487-4D93-4F98-8AB4-27D0565ADC51 |
| IWMCredentialCallback | IID_IWMCredentialCallback | 342E0EB7-E651-450C-975B-2ACE2C90C48E |
| IWMDRMReader | IID_IWMDRMReader | D2827540-3EE7-432C-B14C-DC17F085D3B3 |
| IWMHeaderInfo | IID_IWMHeaderInfo | 96406BDA-2B2B-11D3-B36B-00C04F6108FF |
| IWMHeaderInfo2 | IID_IWMHeaderInfo2 | 15CF9781-454E-482E-B393-85FAE487A810 |
| IWMIndexer | IID_IWMIndexer | 6D7CDC71-9888-11D3-8EDC-00C04F6109CF |
| IWMIndexer2 | IID_IWMIndexer2 | B70F1E42-6255-4DF0-A6B9-02B212D9E2BB |
| IWMInputMediaProps | IID_IWMInputMediaProps | 96406BD5-2B2B-11D3-B36B-00C04F6108FF |
| IWMIStreamProps | IID_IWMIStreamProps | 6816DAD3-2B4B-4C8E-8149-874C3483A753 |
| IWMLicenseBackup | IID_IWMLicenseBackup | 05E5AC9F-3FB6-4508-BB43-A4067BA1EBE8 |
| IWMLicenseRestore | IID_IWMLicenseRestore | C70B6334-A22E-4EFB-A245-15E65A004A13 |
| IWMMediaProps | IID_IWMMediaProps | 96406BCE-2B2B-11D3-B36B-00C04F6108FF |
| IWMMetadataEditor | IID_IWMMetadataEditor | 96406BD9-2B2B-11D3-B36B-00C04F6108FF |
| IWMMetadataEditor2 | IID_IWMMetadataEditor2 | 203CFFE3-2E18-4FDF-B59D-6E71530534CF |
| IWMMutualExclusion | IID_IWMMutualExclusion | 96406BDE-2B2B-11D3-B36B-00C04F6108FF |
| IWMMutualExclusion2 | IID_IWMMutualExclusion2 | 302B57D?-89D1-4BA2-85C9-166F2C53EB91 |

-continued

| Interface | IID constant | GUID |
|---|---|---|
| IWMOutputMediaProps | IID_IWMOutputMediaProps | 96406BD7-2B2B-11D3-B36B-00C04F6108FF |
| IWMPacketSize | IID_IWMPacketSize | CDFB97AB-188F-40B3-B643-5B7903975C59 |
| IWMPacketSize2 | IID_IWMPacketSize2 | 8BFC2B9E-B646-4233-A877-1C6A7?9669DC |
| IWMProfile | IID_IWMProfile | 96406BDB-2B2B-11D3-B36B-00C04F6108FF |
| IWMProfile2 | IID_IWMProfile2 | 07E72D33-D94E-4BE7-8843-60AE5FF7E5F5 |
| IWMProfile3 | IID_IWMProfile3 | 00EF96CC-A461-4546-8BCD-C9A28F0E06F5 |
| IWMProfileManager | IID_IWMProfileManager | D16679F2-6CA0-472D-8D31-2F5D55AEE155 |
| IWMProfileManager2 | IID_IWMProfileManager2 | 7A924E51-73C1-494D-8019-23D37ED9B89A |
| IWMPropertyVault | IID_IWMPropertyVault | 72995A79-5090-42A4-9C8C-D9D0B6D34BE5 |
| IWMReader | IID_IWMReader | 96406BD6-2B2B-11D3-B36B-00C04F6108FF |
| IWMReaderAdvanced | IID_IWMReaderAdvanced | 96406BEA-2B2B-11D3-B36B-00C04F6108FF |
| IWMReaderAdvanced2 | IID_IWMReaderAdvanced2 | AE14A945-B90C-4D0D-9127-80D665F7D73E |
| IWMReaderAdvanced3 | IID_IWMReaderAdvanced3 | 5DC0674B-F04B-4A4E-9F2A-B1AFDE2C8100 |
| IWMReaderAllocatorEx | IID_IWMReaderAllocatorEx | 9F762FA7-A22E-428D-93C9-AC82F3AAFE5A |
| IWMReaderCallback | IID_IWMReaderCallback | 96406BD8-2B2B-11D3-B36B-00C04F6108FF |
| IWMReaderCallbackAdvanced | IID_IWMReaderCallbackAdvanced | 96406BEB-2B2B-11D3-B36B-00C04F6108FF |
| IWMReaderNetworkConfig | IID_IWMReaderNetworkConfig | 96406BEC-2B2B-11D3-B36B-00C04F6108FF |
| IWMReaderStreamClock | IID_IWMReaderStreamClock | 96406BED-2B2B-11D3-B36B-00C04F6108FF |
| IWMReaderTypeNegotiation | IID_IWMReaderTypeNegotiation | FDBE5592-81A1-41EA-93BD-735CAD1ADC5? |
| IWMRegisterCallback | IID_IWMRegisterCallback | CF4B1F99-4DE2-4E49-A363-252740D99BC1 |
| IWMStatusCallback | IID_IWMStatusCallback | 6D7CDC70-9888-11D3-8EDC-00C04F6109CF |
| IWMStreamConfig | IID_IWMStreamConfig | 96406BDC-2B2B-11D3-B36B-00C04F6108FF |
| IWMStreamConfig2 | IID_IWMStreamConfig2 | 7688D8CB-FC0D-43BD-9459-5A8DEC200CFA |
| IWMStreamList | IID_IWMStreamList | 96406BDD-2B2B-11D3-B36B-00C04F6108FF |
| IWMStreamPrioritization | IID_IWMStreamPrioritization | 8C1C6090-F9A8-4748-8EC3-DD1108BA1E77 |
| IWMSyncReader | IID_IWMSyncReader | 9397F121-7705-4DC9-B049-98B698188414 |
| IWMVideoMediaProps | IID_IWMVideoMediaProps | 96406BCF-2B2B-11D3-B36B-00C04F6108FF |
| IWMWriter | IID_IWMWriter | 96406BD4-2B2B-11D3-B36B-00C04F6108FF |
| IWMWriterAdvanced | IID_IWMWriterAdvanced | 96406BE3-2B2B-11D3-B36B-00C04F6108FF |
| IWMWriterAdvanced2 | IID_IWMWriterAdvanced2 | 962DC1EC-C046-4DB8-9CC7-26CEAE500817 |
| IWMWriterAdvanced3 | IID_IWMWriterAdvanced3 | 2CD6492D-7C37-4E76-9D3B-59261183A22E |
| IWMWriterFileSink | IID_IWMWriterFileSink | 96406BE5-2B2B-11D3-B36B-00C04F6108FF |
| IWMWriterFileSink2 | IID_IWMWriterFileSink2 | 14282BA7-4AEF-4205-8CE5-C229035A05BC |
| IWMWriterFileSink3 | IID_IWMWriterFileSink3 | 3FEA4FEB-2945-47A7-A1DD-C53A8FC4C45C |
| IWMWriterFileSinkDataUnit | IID_IWMWriterFileSinkDataUnit | 633392F0-BE5C-486B-A09C-10669C7A6C27 |
| IWMWriterNetworkSink | IID_IWMWriterNetworkSink | 96406BE7-2B2B-11D3-B36B-00C04F6108FF |
| IWMWriterPostView | IID_IWMWriterPostView | 81E20CE4-75EF-491A-8004-FC53C45BDC3E |
| IWMWriterPostViewCallback | IID_IWMWriterPostViewCallback | D9D6549D-A193-4F24-B308-03123D9B7F8D |
| IWMWriterPreprocess | IID_IWMWriterPreprocess | FC54A285-38C4-45B5-AA23-85B9F7CB424B |
| IWMWriterSink | IID_IWMWriterSink | 96406BE4-2B2B-11D3-B36B-00C04F6108FF |

Interfaces

This SDK supports the following interfaces. For more information about which object each interface applies to, see Objects.

| Interface | Description |
|---|---|
| INSSBuffer | Controls a buffer stored in a buffer object. This interface is used for passing samples to and from methods in this SDK. |
| INSSBuffer3 | Manages buffer properties. Buffer properties are used to convey information with a buffer when passed to or from methods of this SDK. |
| IReferenceClock | Provides access to a standard reference clock. |
| IWMBackupRestoreProps | Manages the properties required by the IWMLicenseBackup and IWMLicenseRestore interfaces. |
| IWMBandwidthSharing | Manages the configuration of bandwidth sharing objects. Bandwidth sharing objects are created by profile objects to specify streams that, regardless of their individual bit rates, will never use more than a certain amount of bandwidth between them. |
| IWMClientConnections | Manages the collecting of information about clients connected to a writer network sink object. |
| IWMClientConnections2 | Retrieves advanced client information. |
| IWMCodecInfo | Manages information about the available codecs. This interface is used to retrieve the media formats supported by the codecs. |
| IWMCodecInfo2 | Provides access to the names of codecs and descriptions of their supported formats. |
| IWMCodecInfo3 | Reads the properties of codecs. |
| IWMCredentialCallback | Provides a single method to acquire the credentials of users and check that they have permission to access a remote site. |
| IWMDRMReader | Manages the acquisition of licenses, digital rights management (DRM) properties, and individualization of clients. |
| IWMDRMReader2 | Provides advanced DRM property access. |
| IWMDRMWriter | Provides license creation capabilities from the writer object. |
| IWMHeaderInfo | Manages header information, such as metadata, markers, and so on. |
| IWMHeaderInfo2 | Provides access to information about the codecs used to create the file. |
| IWMHeaderInfo3 | Provides attribute language support and other advanced metadata features. |
| IWMIndexer | Manages indexing. |

| Interface | Description |
|---|---|
| IWMIndexer2 | Provides frame-based indexing capabilities and adds configuration options to the indexing process. |
| IWMInputMediaProps | Manages the properties of an input media stream. |
| IWMIStreamProps | Reads the properties of an IStream object. |
| IWMLanguageList | Manages the language list. |
| IWMLicenseBackup | Manages the backing up of licenses, typically so that they can be restored onto another computer. |
| IWMLicenseRestore | Manages the restoring of licenses. |
| IWMMediaProps | Used as the base interface for the other media-properties interfaces (input, output, and video). |
| IWMMetadataEditor | Provides file management for metadata editing. |
| IWMMetadataEditor2 | Provides an improved method for opening files for use by the metadata editor. |
| IWMMutualExclusion | Manages the configuration of mutual exclusion objects. Mutual exclusion objects are created by profile objects to specify a group of mutually exclusive streams. |
| IWMMutualExclusion2 | Extends the functionality of IWMMutualExclusion. |
| IWMOutputMediaProps | Manages the properties of an output stream. |
| IWMPacketSize | Manages the maximum size of packets in a WINDOWS ® Media file. |
| IWMPacketSize2 | Manages the minimum size of packets in a WINDOWS ® Media file. |
| IWMProfile | Manages the creation and editing of profiles. Profiles describe the format of a file, such as stream type, bit rates, and so on. Most applications use existing profiles and do not need to implement this interface. |
| IWMProfile2 | Provides access to profile IDs. |
| IWMProfile3 | Provides methods for dealing with bandwidth sharing, stream prioritization, and other advanced features supported by profiles. |
| IWMProfileManager | Manages the loading and saving of profiles. |
| IWMProfileManager2 | Manages the version numbers of system profiles used by the profile manager object. |
| IWMProfileManagerLanguage | Manages the language of the enumerated system profiles. |
| IWMPropertyVault | Provides a standardized interface for managing properties. |
| IWMReader | Manages the asynchronous reading of WINDOWS ® Media files. |
| IWMReaderAccelerator | Provides support for DirectX ® Video Acceleration. |
| IWMReaderAdvanced | Provides advanced features of the reader, such as a user-provided clock, buffer allocation, return statistics, and receiving stream selection notifications. |
| IWMReaderAdvanced2 | Provides an additional range of advanced methods for an existing reader object. |
| IWMReaderAdvanced3 | Provides additional advanced methods for the reader object. |
| IWMReaderAdvanced4 | Provides support for language selection and other advanced reading features. |
| IWMReaderAllocatorEx | Provides expanded alternatives to the AllocateForOutput and AllocateForStream methods of the IWMReaderCallbackAdvanced interface. |
| IWMReaderCallback | Implemented by the application to provide sample and status information about a current reading operation. |
| IWMReaderCallbackAdvanced | Optionally implemented by the application to provide advanced functionality to an existing reader callback object. |
| IWMReaderNetworkConfig | Manages network configuration settings. |
| IWMReaderNetworkConfig2 | Provides additional network configuration features. |
| IWMReaderStreamClock | Used to set and cancel timers on stream clocks, as well as to retrieve the current value of the stream clock. |
| IWMReaderTimecode | Provides information about SMPTE time codes in a file. |
| IWMReaderTypeNegotiation | Provides a single method that can be used to test whether certain changes to the output properties of a stream are working properly. |
| IWMRegisterCallback | Manages the registration of callback functions. |
| IWMStatusCallback | Implemented by the application to respond to the status of several objects of this SDK. |
| IWMStreamConfig | Manages the configuration of streams for use in profiles. |
| IWMStreamConfig2 | Provides additional stream-manipulation methods. |
| IWMStreamConfig3 | Manages language information for streams. |
| IWMStreamList | Manages the various objects that define relationships between streams. |
| IWMStreamPrioritization | Provides methods to configure the stream prioritization object. |
| IWMSyncReader | Provides the ability to read files with synchronous calls. |
| IWMSyncReader2 | Adds SMPTE time code support to the synchronous reader. |
| IWMVideoMediaProps | Manages the properties of a video stream. |
| IWMWatermarkInfo | Provides access to the available watermarks. |
| IWMWriter | Used as the main interface for writing WINDOWS ® Media files. |
| IWMWriterAdvanced | Provides advanced functionality for an existing writer object. |
| IWMWriterAdvanced2 | Provides some advanced functionality, particularly for handling deinterlaced video. |
| IWMWriterAdvanced3 | Provides methods for detailed writer statistics. |
| IWMWriterFileSink | Manages a file sink object. |
| IWMWriterFileSink2 | Provides extended management of a file sink object. |
| IWMWriterFileSink3 | Further extends the functionality of the file sink object. |
| IWMWriterFileSinkDataUnit | Provides access to packet and payload information while writing a file. |
| IWMWriterNetworkSink | Manages a network sink object. |
| IWMWriterPostView | Manages the output of samples from the writer. Used to verify encoded content for a file during the encoding process. |
| IWMWriterPostViewCallback | Implemented by the application to receive postview samples from the writer. |
| IWMWriterPreprocess | Manages settings for multi-pass encoding. |
| IWMWriterPushSink | Manages a push sink object. |
| IWMWriterSink | Manages raw WINDOWS ® Media Format input from the writer interfaces. Used as a base interface for the other writer sink interfaces. |

Remarks

The interface identifier for each of the interfaces in this SDK is the name of the interface preceded by "IID_". For example, the identifier for the IWMReaderAdvanced interface is IID_IWMReaderAdvanced. So to obtain a pointer to the IWMReaderAdvanced interface of a reader object, you would use the following code:

hr = pReader->QueryInterface(IID_IWMReaderAdvanced, &pReaderAdvanced);

Mutual Exclusion Objects

A mutual exclusion object is used to specify a number of streams, of which only one can be played at a time. This can be used in several ways, such as providing an audio stream in several languages as the soundtrack for one video stream.

Mutual exclusion is an optional part of a profile. Mutual exclusion objects may be created for existing mutual exclusion information in a profile or may be created empty, ready to receive new data. Mutual exclusion objects cannot exist independently of a profile object. In order to save the contents of a mutual exclusion object, you must call IWMProfile::AddMutualExclusion.

To create a mutual exclusion object, use one of the following methods.

| Method | Description |
| --- | --- |
| IWMProfile::CreateNewMutualExclusion | Creates a mutual exclusion object without any data. |
| IWMProfile::GetMutualExclusion | Creates a mutual exclusion object populated with data from a profile. Uses the mutual exclusion index to identify the desired mutual exclusion information. |

Both methods in the preceding table set a pointer to an IWMMutualExclusion interface. The IWMStreamList interface is inherited by IWMBandwidthSharing and never needs to be accessed directly. The other interface of the mutual exclusion object can be obtained by calling the QueryInterface method.

The following interfaces are supported by every mutual exclusion object.

| Interface | Description |
| --- | --- |
| IWMMutualExclusion | Provides methods to set and retrieve the type of mutual exclusion to be used. |
| IWMMutualExclusion2 | Provides additional configuration options for mutual exclusion. |
| IWMStreamList | Manages the objects that define relationships between streams. |

Remarks

The reader object and the synchronous reader object both support IWMProfile, IWMProfile2, and IWMProfile3. You can also access mutual exclusion objects that are part of a file loaded into the reader.

What is claimed is:

1. A method comprising:
assigning a bandwidth in a streamable content; and
transmitting a modulated data signal having data fields encoded thereon transmitted over a communications channel having the assigned bandwidth, said modulated data signal representing the streamable content, said assigned bandwidth specifying a bandwidth based on a first bandwidth for transmitting the entire data fields of the modulated data signal, said data fields comprising data encoded in the data fields in the streamable content representing a combined stream including a first stream having the first bandwidth and including a second stream having a second bandwidth, wherein the first stream represents a first portion of the streamable content and the second stream represents a second portion of the streamable content, wherein the first bandwidth is greater than the second bandwidth, wherein the first stream is transmitted simultaneously with the second stream, wherein, during certain periods of time, the combined stream consists primarily of either the first stream or the second stream but not both so that during the certain periods the combined stream has a bandwidth which is less than or equal to the first bandwidth, and wherein the assigned bandwidth of the communications channel allocated to the combined stream is less than or equal to the first bandwidth.

2. The method of claim 1, wherein transmitting comprises transmitting the data representing the combined stream includes the data representing the first stream, the second stream, and at least one additional stream having an additional bandwidth, wherein the data representing the additional stream represents an additional portion of the streamable content and is transmitted simultaneously with the first and second streams, wherein during certain periods of time, the combined stream consists primarily of either the first stream and the additional stream or the second stream and additional stream but not the first and second stream so that during the certain periods the bandwidth of the combined stream is less than or equal to the first bandwidth plus the additional bandwidth, and wherein the assigned bandwidth of the communications channel allocated to the combined stream is less than or equal to the first bandwidth plus the additional bandwidth.

3. The method of claim 1, wherein transmitting comprises transmitting the data representing the combined stream includes the data representing the first stream, the second stream, and a plurality of additional streams having a total additional bandwidth, wherein the data representing the plurality of additional streams represents the remaining portion of the streamable content and is transmitted simultaneously with the first and second streams, wherein, during certain periods of time, the combined stream consists primarily of either the first stream and the plurality of additional streams or the second stream and the plurality of additional streams but not the first and second stream so that during the certain periods the bandwidth of the combined stream is less than or equal to the first bandwidth plus the total additional bandwidth, and wherein the assigned bandwidth of the communications channel allocated to the combined stream is less than or equal to the first bandwidth plus the total additional bandwidth.

4. The method of claim 1, wherein transmitting the modulated data signal comprises transmitting the modulated data signal have data fields, said data fields including:
a first data field containing descriptive information of the first stream having the first bandwidth for transmitting the content;
a second data field containing descriptive information of the second stream having the second bandwidth for transmitting the content; and
a third data field containing an object specified by the content author before transmission of the content said object indicating the designated bandwidth.

5. The method of claim 4, wherein said data structure further comprises:
at least one additional data field containing descriptive information of an additional stream of information having an additional bandwidth for transmitting the content, wherein the additional stream is transmitted simultaneously with the first and second streams, wherein the bandwidth value in the object is less than the total of the first bandwidth, the second bandwidth and the additional bandwidth.

6. The method of claim 4, wherein, during certain periods of time of transmission, the data structure consists primarily (1) of the first data field containing descriptive information of a portion of the first stream having a first partial bandwidth which is less than the first bandwidth and (2) of second data field containing descriptive information of a portion of the second stream having a second partial bandwidth which is less than the second bandwidth and wherein the bandwidth value is less than or equal to the total of the first partial bandwidth and the second partial bandwidth.

7. The method of claim 4, wherein the object is in a header of the data structure.

8. The method of claim 7, where the header includes:

| Field Name | Field Type | Size (bits) |
| --- | --- | --- |
| Object ID | GUID | 128 |
| Object Size | QWORD | 64 |
| Sharing Type | GUID | 128 |
| Data Bit Rate | DWORD | 32 |
| Buffer Size | DWORD | 32 |
| Stream Numbers Count | WORD | 16 |
| Stream Numbers | WORD | a list of the streams in the bandwidth of the modulated data signal. |

9. The method of claim 1, wherein, during certain periods of time of transmission, the data structure consists primarily of the first data field containing descriptive information of the first stream only or the second data field containing descriptive information of the second stream only and wherein the bandwidth value is less than or equal to the first bandwidth.

10. The method of claim 1, wherein said assigned bandwidth indicates a bandwidth sharing object, specified by the content author who created the content before transmitting the content, specifying a bandwidth as the bandwidth sharing object for simultaneously streaming N streams as the combined stream (where N is an integer greater than 1), wherein the bandwidth sharing object is a function of the bandwidth of each of the streams and includes a bandwidth value specified in the object which is less than the total of the bandwidth of the N streams.

11. The method of claim 10, wherein, during certain periods of time, the combined stream consists primarily of N-A streams (where A is an integer less than N) and wherein the bandwidth value specified in the object is less than or equal to the total bandwidth of the N-A streams.

12. The method of claim 10, wherein, during certain periods of time, the combined stream consists primarily of a portion of one or more of the streams and wherein the bandwidth value is less than or equal to the total bandwidth of the portion of the one or more streams plus the bandwidth of remaining streams.

13. The method of claim 10, wherein the object is in a header of the data structure representing a modulated data signal.

14. A method comprising: assigning a bandwidth; and transmitting a modulated data signal having data fields encoded thereon transmitted over a communications channel having the assigned bandwidth, said modulated data signal represents a streamable content, said data fields comprising data encoded in the data fields representing a combined stream including a first stream having a first bandwidth and including a second stream having a second bandwidth, wherein the first stream represents a first portion of the streamable content and the second stream representing a second portion of the streamable content, wherein the first bandwidth is greater than the second bandwidth, wherein the first stream is transmitted simultaneously with the second stream, wherein during certain periods of time, the combined stream consists primarily (1) of a portion of the first stream having a first partial bandwidth which is less than the first bandwidth and the second stream, or (2) of a portion of the second stream having a second partial bandwidth which is less than the second bandwidth and the first stream, so that during the certain periods the combined stream has a bandwidth which is less than or equal to the first partial bandwidth plus the second bandwidth or the second partial bandwidth plus the first bandwidth, respectively, and wherein the assigned bandwidth of the communications channel allocated to the combined stream is less than or equal to the total of the first partial bandwidth and the second partial bandwidth.

15. The method of claim 14 wherein transmitting comprises transmitting the data representing the combined stream including the first stream, the second stream and at one additional stream having an additional bandwidth, wherein the additional stream is transmitted simultaneously with the first and second streams, wherein, during certain periods of time, the combined stream consists primarily (1) of the portion of the first stream with the second and additional streams, or (2) the portion of the second stream with the first and additional streams, so that during the certain periods the bandwidth of the combined stream is less than or equal to the first partial bandwidth plus the second and additional bandwidths or the second partial bandwidth plus the first and additional bandwidths, respectively, and wherein the assigned bandwidth of the communications channel allocated to the combined stream is less than or equal to the total of the first bandwidth, the second bandwidth and the additional bandwidth.

16. The method of claim 14 wherein transmitting comprises transmitting the combined stream including the first stream, the second stream and a plurality of additional streams having a total additional bandwidth, wherein the plurality of additional streams is transmitted simultaneously with the first and second streams, wherein, during certain periods of time, the combined stream consists primarily of (1) the portion of the first stream with the second and plurality of additional streams, or (2) the portion of the second stream with the first and plurality of additional streams, so that during the certain periods the bandwidth of the combined stream is less than or equal to the first partial bandwidth plus the second bandwidth and the total additional bandwidth or the second partial bandwidth plus the first bandwidth and the total additional bandwidth, respectively, and wherein the assigned bandwidth of the communications channel allocated to the combined stream is less than or equal to the total of the first bandwidth, the second bandwidth and the total additional bandwidth.

17. A method comprising: assigning a bandwidth to a content; and transmitting the content including a modulated data signal having data fields encoded thereon from an author who created the content over a communications channel having the assigned bandwidth, said modulated data signal representing the content, said data fields comprising data encoded in the data fields representing a combined stream including data representing one or more of the following:

an audio stream having an audio bandwidth;
a video stream having a video bandwidth;
a file transfer stream having a file transfer bandwidth; and
a text stream having a text bandwidth, wherein the file transfer bandwidth is greater than the text bandwidth, wherein the streams are transmitted simultaneously with each other, wherein, during certain periods of time and during the transmission of the combined stream, the combined stream includes primarily either the file transfer stream or the text stream but not both so that during the certain periods the combined stream has a combined bandwidth which is less than or equal to the audio bandwidth plus the video bandwidth plus the file transfer bandwidth, wherein the assigned bandwidth of the communications channel allocated to the combined stream is less than or equal to the audio bandwidth plus the video bandwidth plus the file transfer bandwidth, said assigned bandwidth being specified by the content author and being a function of a relationship among each of the combined stream.

18. A method comprising: assigning a bandwidth to a content; and transmitting the content including a modulated data signal having data fields encoded thereon from an author who created the content over a communications channel having the assigned bandwidth, said modulated data signal representing the content, said data fields comprising data encoded in the data fields representing a combined stream including data representing one or more of the following:
an audio stream having an audio bandwidth;
a video stream having a video bandwidth;
a file transfer stream having a file transfer bandwidth; and
a text stream having a text bandwidth, wherein the file transfer bandwidth is greater than the text bandwidth, wherein the streams are transmitted simultaneously with each other, and wherein during certain periods of time and during the transmission of the combined stream, the combined stream includes primarily (1) a portion of the file transfer stream having a file transfer partial bandwidth which is less than the file transfer bandwidth and (2) a portion of the text stream having a text partial bandwidth which is less than the text bandwidth so that during the certain periods the combined stream has a combined bandwidth which is less than or equal to the audio bandwidth plus the video bandwidth plus the partial file transfer bandwidth plus the partial text bandwidth, wherein the assigned bandwidth of the communications channel allocated to the combined stream is based on and is less than or equal to the audio bandwidth plus the video bandwidth plus the partial file transfer bandwidth plus the partial text bandwidth, wherein said assigned bandwidth being specified by a content author and being a function of a relationship among each of the combined stream.

19. A method of transmitting an advanced streaming format video stream content from a source to a destination for an author comprising:
receiving a request from the destination for the advanced streaming format video stream;
sending a composite stream from the source to the destination having a plurality of component streams in response to the received request, said composite stream representing the advanced streaming format video stream content said advanced streaming format video stream content being created by the author; and
sending an object, specified by the content author before transmission of the content, from the source indicating a bandwidth of the composite stream, wherein said indicated bandwidth is less than a total bandwidth of the plurality of component streams, said indicated bandwidth specifying a bandwidth based on a first bandwidth for sending the composite stream, said composite stream comprising a first stream having the first bandwidth and including a second stream having a second bandwidth, wherein the first stream represents a first portion of the composite stream and the second stream represents a second portion of the composite stream, wherein the first bandwidth is greater than the second bandwidth, wherein the first stream is transmitted simultaneously with the second stream, wherein, during certain periods of time, the composite stream consists primarily of either the first stream or the second stream but not both so that during the certain periods the composite stream has a bandwidth which is less than or equal to the first bandwidth, and wherein the indicated bandwidth allocated to the composite stream is less than or equal to the first bandwidth.

20. The method of claim 19 further comprising receiving the composite stream at the destination by indicating the bandwidth as indicated by the object.

21. The method of claim 19 wherein sending a composite stream includes sending the composite stream consisting primarily at any instant of time of only one of the plurality of streams and wherein sending an object includes sending a bandwidth value corresponding to the greater of the bandwidth of the each of the plurality of composite streams.

22. The method of claim 19 wherein sending a composite stream includes sending the composite stream consisting primarily at any instant in time of a proportional amount of streams and wherein sending the object includes sending a bandwidth value corresponding to the total bandwidth of the proportional amount of streams.

23. The method of claim 19, wherein one or more computer storage media have computer-executable instructions for performing the method of claim 27, further comprising executing the computer-executable instructions to implement said receiving the request, sending the composite stream and sending the object.

24. In a computer system, a method for transmitting content from an author, comprising:
receiving a data structure that holds multiple streams of data, said data structure within the content created by the author, said streams of data comprising samples that are stored in packets in the data structure and wherein the data structure includes bandwidth-sharing data that was stored prior to a request being transmitted by the computer system that caused the data structure to be received, wherein the bandwidth-sharing data indicates a combined bandwidth of the streams of data, wherein the combined bandwidth is a function of a bandwidth of each of the streams of data, and wherein the combined bandwidth is less than a sum of the bandwidths of the streams of data, said bandwidth-sharing data specifying a bandwidth based on a first bandwidth for sending the multiple streams of data, said multiple streams of data comprising a first stream having the first bandwidth and including a second stream having a second bandwidth, wherein the first stream represents a first portion of the multiple streams of data and the second stream represents a second portion of the multiple streams of data, wherein the first bandwidth is greater than the second bandwidth, wherein the first stream is transmitted simultaneously with the second stream, wherein, during certain periods of time, the multiple streams of data consists primarily of either the first stream or the second stream but not both so that during the certain periods the multiple streams of data have a bandwidth which is less than or equal to the first bandwidth, and wherein the combined bandwidth allocated to the streams of data is further less than or equal to the first bandwidth; and extracting the bandwidth-sharing data, specified by the content author before transmission of the content to adjust network resource requirements according to the combined bandwidth.

25. The method of claim 24, wherein one or more computer readable storage media have computer-executable instructions for performing the method of claim 24, further comprising executing the computer-executable instructions to implement said receiving and said extracting.

26. A data processing system for transmitting content from an author having:
 a source computer with a storage;
 a data structure stored in the storage for encapsulating multiple data streams into an aggregated data stream defined by the data structure, data from the data streams being incorporated in packets prior to a request being received by the source computer to transmit the aggregated data stream to a destination computer, said aggregated being within the content; and
 bandwidth-sharing data within the content, specified by the content author before transmission of the content, encapsulated in a header associated with the packets, wherein the bandwidth-sharing data indicates a combined bandwidth of the aggregated data stream, wherein the combined bandwidth is a function of a bandwidth of each of the data streams, and wherein the combined bandwidth is less than a sum of the bandwidths of the data streams, said bandwidth-sharing data specifying a bandwidth based on a first bandwidth for sending the aggregated data stream, said aggregated data stream comprising a first stream having the first bandwidth and including a second stream having a second bandwidth, wherein the first stream represents a first portion of the aggregated data stream and the second stream represents a second portion of the aggregated data stream, wherein the first bandwidth is greater than the second bandwidth, wherein the first stream is transmitted simultaneously with the second stream, wherein, during certain periods of time, the aggregated data stream consists primarily of either the first stream or the second stream but not both so that during the certain periods the aggregated data stream has a bandwidth which is less than or equal to the first bandwidth, and wherein the combined bandwidth allocated to the aggregated data stream is less than or equal to the first bandwidth.

27. The data processing system of claim 26, wherein, during certain periods of time of transmission, the aggregated data stream consists primarily of a partial combined data stream consisting of less than all the data streams and wherein the combined bandwidth is less than or equal to a bandwidth of the partial combined data stream.

28. The data processing system of claim 26, wherein, during certain periods of time of transmission, the aggregated data stream consists primarily of a proportional combined data stream consisting of a portion of one or more of the data streams and the remaining data streams and wherein the combined bandwidth is less than or equal to a bandwidth of the proportional combined data stream.

29. In a computer system operable for connecting to a communications channel, a method of encapsulating multiple streams of data into an aggregated data stream to be transmitted on the communications channel, said method transmits content from an author, comprising:
 determining a packet size for the communications channel;
 storing, on a storage device, at least one packet containing information about the aggregated data stream to form a header section in a data structure that defines the aggregated data stream, said data structure being part of the content created by the author;
 storing, on the storage device, packets containing samples of data from the multiple data streams to form a data section in the data structure;
 designating a portion of at least one packet in the data section for holding bandwidth-sharing data, said bandwidth data being specified by the content author before transmission of the content said bandwidth-sharing data specifying a bandwidth based on a first bandwidth for sending the aggregated data stream, said aggregated data stream comprising a first stream having the first bandwidth and including a second stream having a second bandwidth, wherein the first stream represents a first portion of the aggregated data stream and the second stream represents a second portion of the aggregated data stream, wherein the first bandwidth is greater than the second bandwidth, wherein the first stream is transmitted simultaneously with the second stream, wherein, during certain periods of time, the aggregated data stream consists primarily of either the first stream or the second stream but not both so that during the certain periods the aggregated data stream has a bandwidth which is less than or equal to the first bandwidth, and wherein the combined bandwidth allocated to the aggregated data stream is less than or equal to the first bandwidth; and
 storing, on the storage device, the bandwidth-sharing data in a header associated with the packets, wherein the bandwidth-sharing data indicates a combined bandwidth of the aggregated data stream, wherein the combined bandwidth is a function of a bandwidth of each of the streams of data, and wherein the combined bandwidth is less than a sum of the bandwidths of the streams of data, and further wherein the aggregated data stream is stored on the storage device prior to receiving a request for transmission of the aggregated data stream on the communications channel from a destination computer.

30. The method of claim 29, wherein one or more computer storage media have computer-executable instructions for performing the method of claim 29, further comprising executing the computer-executable instructions to implement said determining, said storing the at least one packet, said storing the packets, said designating, and said storing the bandwidth-sharing data.

* * * * *